United States Patent

Moroishi et al.

[11] Patent Number: 5,900,324
[45] Date of Patent: May 4, 1999

[54] MAGNETIC RECORDING MEDIA, METHODS FOR PRODUCING THE SAME AND MAGNETIC RECORDERS

[75] Inventors: Keiji Moroishi; Takashi Sato, both of Yamanashi; Jun-ichi Horikawa; Masato Kobayashi, both of Tokyo; Hisao Kawai, Yamanashi; Osamu Nozawa, Tokyo, all of Japan

[73] Assignee: Hoya Corporation, Tokyo, Japan

[21] Appl. No.: 08/548,863

[22] Filed: Oct. 26, 1995

[30] Foreign Application Priority Data

Oct. 27, 1994 [JP] Japan .................................. 6-263869
Jun. 28, 1995 [JP] Japan .................................. 7-161942

[51] Int. Cl.$^6$ ..................................................... G11B 5/66
[52] U.S. Cl. ........................... 428/611; 428/635; 428/663; 428/65.7; 428/694 TM; 428/694 TS; 428/900; 428/928; 204/192.15; 204/192.2
[58] Field of Search ................................. 428/611, 635, 428/663, 65.7, 694 TM, 694 TS, 900, 928; 204/192.15, 192.2

[56] References Cited

U.S. PATENT DOCUMENTS

| | | | |
|---|---|---|---|
| 4,652,499 | 3/1987 | Howard | 428/641 |
| 5,006,388 | 4/1991 | Kuzuo et al. | 428/64 |
| 5,051,288 | 9/1991 | Ahlert et al. | 428/64 |
| 5,227,212 | 6/1993 | Ahlert et al. | 360/97.01 |
| 5,413,873 | 5/1995 | Mizukami | 428/611 |
| 5,456,978 | 10/1995 | Lal et al. | 428/332 |
| 5,536,585 | 7/1996 | Futamoto et al. | 428/611 |
| 5,562,982 | 10/1996 | Hiwatashi | 428/332 |
| 5,723,198 | 3/1998 | Hosoe et al. | 428/141 |

FOREIGN PATENT DOCUMENTS

| | | |
|---|---|---|
| 2-210614 | 8/1990 | Japan . |
| 0388088 | 3/1992 | Japan . |
| 4-16848 | 3/1992 | Japan . |

OTHER PUBLICATIONS

Melnick and Randet, "Thin Evaporated Films with High Coercive Force", IEEE Transactions on Magnetics, vol. Mag–3, No. 3, Sep. 1967.
Kashiwakura et al, "Investigation of Magnetic Recording Media with Magnetic Layer Divided by Cr Interlayer", IEEE Translation on Magnetics in Japan, vol. 9, No. 2, Mar. 1, 1994.
Patent Abstracts of Japan, vol. 14, No. 508, Nov. 1990.
Patent Abstracts of Japan, vol. 9, No. 2, Mar. 1, 1994.

Primary Examiner—Stevan A. Resan
Attorney, Agent, or Firm—Burns, Doane, Swecker & Mathis, L.L.P.

[57] ABSTRACT

Disclosed are magnetic recording media comprising, on a substrate, two or more CrPt based magnetic layers and one or more CrMo based non-magnetic spacer layers between the magnetic layers and processes for preparation thereof. The magnetic recording media of the present invention include magnetic tapes and magnetic disks. The magnetic recording media are capable of suppressing noise generation upon reproducing recorded signals by employing magnetic layers having a small thickness. The magnetic recorders utilizing the above magnetic recording media are also disclosed.

46 Claims, 3 Drawing Sheets

MAGNETIC RECORDING MEDIA, METHODS FOR PRODUCING THE SAME AND MAGNETIC RECORDERS

FIELD OF THE INVENTION

The present invention relates to magnetic recording media such as magnetic tapes and magnetic disks. In particular, it relates to magnetic recording media capable of suppressing noise generation upon reproducing recorded signals by employing magnetic layers having a small thickness and methods for producing them. The present invention further relates to magnetic recorders utilizing the above magnetic recording media.

BACKGROUND OF THE INVENTION

Recently, much attention has been paid to magnetic recording media having thin magnetic metal films produced by spattering or vacuum deposition techniques as magnetic layers. The main reason why those thin magnetic metal films are paid much attention as magnetic recording media is, as well known in the art, that they can realize higher recording densities compared with prior materials having coated magnetic powder. It has been known that Co-containing alloys can exhibit good magnetic coercive force and squareness ratio as magnetic materials for such thin magnetic metal films. In particular, CoPt alloy thin layers have recently been paid much attention for industrial purpose as materials capable of realizing higher recording density because they show high magnetic coercive force and residual flux density.

Further, in magnetic recording media for magnetoresistive (MR) type heads, a lower medium noise level is required rather than an output magnitude. As media meeting to this demand, there have been known a magnetic recording medium comprising a substrate, two magnetic layers of CoPtCr provided on the substrate and a nonmagnetic spacer layer comprising Cr provided between the magnetic layers (Japanese Patent Un-examined Publication [KOKAI] No. 2-210614). Because the magnetic layer of this magnetic recording medium is splitted into two layers by the non-magnetic spacer layer, it has a smaller thickness of each magnetic layer compared with that of those media comprising one magnetic layer and having the same total magnetic layer thickness and hence it can reduce noises upon reproducing recorded signals.

Magnetic recording media having the structure described above can indeed reduce noises because of the smaller thickness of each magnetic layer obtained by splitting the magnetic layer with the non-magnetic spacer layer. However, various evaluations of these magnetic recording media in terms of properties required for practical use have revealed that they have drawbacks such as follows:

(1) Reduction of magnetic coercive force of these media is more significant compared with those having one magnetic layer. Therefore, even if Pt alloy magnetic layers having more excellent magnetic coercive force compared with other materials are used as magnetic layers, they cannot make the most of their advantages.

(2) Their overwriting properties are insufficient.

Therefore, the first object of the present invention is to provide magnetic recording media comprising two or more CoPt alloy magnetic layers separated by one or more non-magnetic spacer layers and showing low medium noise and excellent magnetic coercive force as well as excellent overwriting characteristics and methods for producing them.

Further, the prior media have a drawback that they show poor corrosion resistance and therefore reproducing errors may be caused by corrosion generated during their use for a long period of time.

Therefore, the second object of the present invention is to provide magnetic recording media which satisfy the first object of the present invention described above and, in addition, are excellent in corrosion resistance.

Further, the third object of the present invention is to provide magnetic recorders showing a high S/N ratio upon signal recording and have a high recording capacity and excellent resistance to environmental variance.

Meanwhile, underlayers of Cr in magnetic recording media comprising magnetic layers of CoNiCr alloys, CoCrTa alloys or the like have been known to be able to provide high magnetic coercive force (see, for example, IEEE TRANSACTION ON MAGNETICS VOL. MAG-3, NO. 3 (1967), p. 205–507).

However, when CoPt alloy magnetic layers are used, underlayers composed of a sole component of Cr disadvantageously deteriorate C-axis orientation. Lattice constants of CoPt alloy magnetic layers are larger than crystalline lattice constants of magnetic layers composed of CoNiCr alloys, CoCrTa alloys and the like because of the larger atomic radius of Pt. Therefore, their conformity with the underlayers composed of a sole component of Cr in terms of atomic arrangement is deteriorated and as a result the C-axis orientation is deteriorated.

As a means for solving this problem, it has been proposed that a second metal (dissimilar metal) is added to the Cr underlayers to make crystalline lattice constants larger. By utilizing Cr alloy (such as CrV) underlayers where a dissimilar metal is added to change lattice constant of the alloy underlayers, the C-axis orientation at layer surfaces can be improved to enhance magnetic coercive force and squareness ratio (Japanese Patent Publication [KOKOKU] No. 4-16848).

However, the present inventors study revealed that medium noise is sharply increased by the addition of a dissimilar metal to the Cr underlayers.

Therefore, the forth object of the present invention is to provide magnetic recording media comprising a Cr alloy underlayer and two or more CoPt alloy magnetic layers separated by one or more non-magnetic spacer layers and showing low medium noise and methods for producing them.

In addition, the fifth object of the present invention is to provide magnetic recording media comprising a Cr alloy underlayers and CoPt alloy magnetic layers and showing high magnetic coercive force, squareness ratio and low medium noise, and methods for producing them.

Furthermore, the sixth object of the present invention is to provide magnetic recording media comprising a Cr alloy underlayer and two or more CoPt alloy magnetic layers separated by one or more and non-magnetic spacer layers and showing low medium noise, excellent magnetic coercive force and overwriting properties, and methods for producing them.

As a result of the present inventors' research, it was found that, in magnetic recording media comprising two or more CoPt alloy magnetic layers separated by one or more non-magnetic spacer layers, magnetic coercive force and overwriting characteristics are deteriorated depending on compositions of materials of the layers separating the magnetic layers and their production conditions. Further, it was found that, in such magnetic recording media as described above having CoPt alloys as the magnetic layers, medium noise can be reduced while magnetic coercive force and overwriting properties are maintained by utilizing alloys consisting mainly of Cr and Mo for the non-magnetic spacer layers separating the magnetic layers and adjusting crystalline lattice spacings of (002) faces in the CoPt alloy magnetic layers to crystalline lattice spacings of (110) faces in the Cr alloy non-magnetic underlayers immediately under the magnetic layers.

Furthermore, also as a result of the present inventors' research, it was found that ununiformity of crystalline particle size and crystallinity of the Cr underlayers are reduced by adding dissimilar metals such as Mo to the layers through transmission electron microscopy. That is, it was found that, because growth of the CoPt alloy magnetic layers such as CoPtCr to be laminated on the Cr alloy underlayers is strongly influenced by particle sizes and crystallinity of the underlayers, ununiform particle sizes and bad crystallinity of the Cr underlayers lead to ununiform crystalline particle sizes and markedly bad crystallinity of the magnetic layers and they increase medium noise.

Based on the above, a second underlayer comprising a Cr alloy obtained by adding a dissimilar metal to Cr was experimentally laminated on a layer (underlayer) having uniform crystalline particle size and good crystallinity and, as a result, it was observed that uniform crystalline particle size and good crystallinity of the Cr alloy underlayer were obtained. However, using two underlayers as described above still could not reduce medium noise sufficiently.

Therefore, further research was conducted and it was found that medium noise can be markedly reduced by adjusting crystalline lattice spacings of (002) faces in the CoPt alloy magnetic layers to crystalline lattice spacings of (110) faces in the top underlayer, i.e., the Cr alloy (Cr added with dissimilar metals) underlayer. That is, by minimizing differences between the crystalline lattice spacings of (002) faces in the CoPt alloy magnetic layers and the crystalline lattice spacing of (110) faces in the top underlayer, i.e., the Cr alloy underlayer, medium noise can be reduced while magnetic coercive force and overwriting properties are simultaneously improved.

Incidentally, it is not desirable that there is no difference between the crystalline lattice spacings of (002) faces in the CoPt alloy magnetic layers and the crystalline lattice spacings of (110) faces in the Cr alloy underlayers or in the Cr alloy spacer layers. A plenty of experiments revealed that some difference is preferred to reduce the noise. That is, medium noise is reduced by controlling the C-axis orientation of magnetic layers within a certain range.

SUMMARY OF THE INVENTION

The present invention relates to magnetic recording media comprising, on a substrate, two or more magnetic layers and one or more non-magnetic spacer layers between the magnetic layers wherein the non-magnetic spacer layers consist mainly of Cr and Mo and the magnetic layers consist mainly of Co and Pt (first embodiment of the magnetic recording media according to the present invention).

The present invention further relates to magnetic recording media comprising a non-magnetic underlayer and a group of CoPt magnetic layers provided on a substrate in this order wherein:

the group of CoPt magnetic layers comprises two or more magnetic layers and one or more non-magnetic spacer layers consisting mainly of Cr and Mo are provided between said magnetic layers, and difference $(d_{(002)}-d_{(110)})$ obtained by subtracting crystalline lattice spacings of bcc (110) faces in the non-magnetic spacer layers consisting mainly of Cr and Mo from crystalline lattice spacings of hcp (002) faces in the magnetic layers immediately above the non-magnetic spacer layers falls within a range of from about 0.002 to 0.032 Å (second embodiment of the magnetic recording media according to the present invention).

The present invention further relates to magnetic recording media comprising a non-magnetic underlayer and a group of CoPt magnetic layers provided on a substrate in this order wherein:

the group of CoPt magnetic layers comprises two or more magnetic layers and one or more non-magnetic spacer layers consisting mainly of Cr and Mo are provided between the magnetic layers, difference $(d_{(002)}-d_{(110)})$ obtained by subtracting crystalline lattice spacings of bcc (110) faces in the non-magnetic spacer layers consisting mainly of Cr and Mo from crystalline lattice spacings of hcp (002) faces in the magnetic layers immediately above the non-magnetic spacer layers falls within a range of from about 0.002 to 0.032 Å, the above non-magnetic underlayer comprises one or more layers and the top layer of the above layers immediately below the lowest CoPt magnetic layer is composed of a material consisting mainly of Cr and Mo, and difference $(d_{(002)}-d_{(110)})$ obtained by subtracting crystalline lattice spacing of bcc (110) faces in the above non-magnetic underlayer consisting mainly of Cr and Mo from crystalline lattice spacing of hcp (002) faces in the lowest magnetic layer of the magnetic layers falls within a range of from about 0.002 to 0.032 Å (third embodiment of the magnetic recording media according to the present invention).

The present invention further relates to methods for producing magnetic recording media according to the second embodiment of the present invention wherein the group of CoPt magnetic layers and the non-magnetic spacer layers consisting mainly of Cr and Mo are formed by a spattering technique using a substrate heating temperature within a range of about 250 to 425° C. and an Ar gas pressure within a range of about 0.5 to 10 mTorr.

In addition, the present invention also relates to methods for producing magnetic recording media according to the third embodiment of the present invention wherein at least the non-magnetic underlayer consisting mainly of Cr and Mo, the group of CoPt magnetic layers and the non-magnetic spacer layers consisting mainly Cr and Mo are formed by a spattering technique using a substrate heating temperature within a range of about 250 to 425° C. and an Ar gas pressure within a range of about 0.5 to 10 mTorr.

The present invention further relates to magnetic recorders comprising one or more magnetic disks and one or more magnetoresistive type heads wherein the magnetic disks are according to any one of the embodiments of the magnetic recording media of the present invention described above.

DETAILED DESCRIPTION OF THE INVENTION

The present invention will be further explained in detail hereinafter.

Magnetic Recording Media of the First Embodiment

The magnetic recording media according to the first embodiment of the present invention basically comprise, on a substrate, two or more magnetic layers and at least one non-magnetic spacer layer between the magnetic layers.

Materials for the substrate are not particularly limited. Examples of the substrates include glass substrates, crystallized glass substrates, aluminum substrates, ceramic substrates, carbon substrates, silicon substrates and the like.

The magnetic recording media according to the first embodiment of the present invention comprise two or more magnetic layers. The number of the magnetic layers may be decided to be more than two layers, for example, three layers, four layers, five layers or the like considering overwriting properties and the like, while they usually have around five layers at most for practical use. However, they of course may have six or more magnetic layers, if desired.

The magnetic recording media according to the first embodiment of the present invention comprise one or more non-magnetic layers between the two or more magnetic layers. The non-magnetic layers are usually provided directly between the magnetic layers. However, if necessary, intermediate layers may be provided between the magnetic layers and the non-magnetic spacer layers. When three or more magnetic layers are provided, it is preferred that every two adjacent magnetic layers have a non-magnetic spacer layer between them. In such a case, the number of the magnetic layers is (N), the number of the non-magnetic layers should be (N−1). However, when three or more magnetic layers are provided, every two adjacent magnetic layers may not have a non-magnetic layer between them as the case may be and at least one non-magnetic layer may be provided between the magnetic layers. Thickness of each magnetic layer is suitably about 50 to 230 Å, preferably about 80 to 150 Å. Thickness of each non-magnetic layer is suitably about 10 to 100 Å, preferably about 30 to 50 Å.

In the layer structure, th number of layers may be increased like, for example, magnetic layer/non-magnetic layer/magnetic layer/non-magnetic layer/magnetic layer, other than the structure of magnetic layer/non-magnetic layer/magnetic layer as used in the working examples disclosed hereinafter. Material and thickness of the magnetic layers may vary among two or more magnetic layers. Similarly, material and thickness of the non-magnetic spacer layers may vary among two or more non-magnetic spacer layers.

The magnetic layers are composed of alloys consisting mainly of Co and Pt. The alloys consisting mainly of Co and Pt preferably contain about 70 at % (atomic percent) or more of Co and Pt in total in order to obtain sufficient magnetic coercive force. Though ratio of Co and Pt is not particularly limited, the ratio Pt/Co (at %) is preferably within a range of about 0.06 to 0.2 in view of magnetic coercive force, noise and cost. Components other than Co and Pt are not particularly limited and one or more components may be selected from the group of Cr, Ta, Ni, Si, B, O, N, Nb, Mn, Mo, Zn, W, Pb, Re, V, Sm and Zr. The amount of these elements may desirably be decided in view of magnetic characteristics and the like and, in general, it is suitably equal to 30 at % or less.

More specifically, CoPtCr alloys, CoPtTa alloys, CoPtCrB alloys, CoPtCrTa alloys, CoPtCrNi alloys and the like can be mentioned as examples of the materials of the magnetic layers.

The non-magnetic layers are composed of alloys consisting mainly of Cr and Mo. The alloys consisting mainly of Cr and Mo preferably contain 90 at % or more of Cr and Mo in total in order to obtain good matching with the magnetic layers in terms of lattice constant. Though ratio of Cr and Mo is not particularly limited, lower limit of Mo content is suitably 2 at %, preferably 5 at % and its upper limit is suitably 30 at %, preferably 15 at % in order to obtain more remarkable effect of improving magnetic coercive force and the like according to the present invention. Components other than Cr and Mo are not particularly limited and one or more components may be selected from the group of Zr, W, B, V, Nb, Ta, Fe, Ni, Re, Ce, Zn, P, Si, Ga, Hf, Al and Ti. The amount of these elements may desirably be decided by considering magnetic characteristics and the like and, in general, it is suitably equal to 10 at % or less.

According to the present invention, also intended are non-magnetic layers comprising two layers one of which is composed of an alloy consisting mainly of Cr and Mo. In such a case, it is preferred that non-magnetic layer of the substrate side is composed of Cr while non-magnetic layer provided thereon is composed of alloys consisting mainly of Cr and Mo.

Face spacings of the alloys for the non-magnetic spacer layers which consist mainly of Cr and Mo are preferably similar to, more preferably substantially the same with lengths of c-axis of hexagonal close-packed structures of the alloys consisting mainly of Co and Pt of the magnetic layers in order to obtain higher effects of the present invention such as more effective improvement of magnetic coercive force. It is considered that, due to the similarity of their face spacings, good crystalline growth of the alloys constituting the magnetic layers can be obtained and thereby their various magnetic characteristics including magnetic coercive force are improved.

According to the present invention, good matching of lattice spacings of the magnetic layers and the non-magnetic layers is obtained by utilizing alloys consisting mainly of Cr and Mo as the non-magnetic layers and hence magnetization-easy axis of the magnetic layers become likely to orient in inplane directions. As a result, magnetic coercive force is improved. Improved magnetic coercive force makes it possible to use thinner non-magnetic layers compared with Cr non-magnetic layers with the same magnetic coercive force and hence spattering speed is lowered when spattering is performed. This leads to good crystallinity of the alloys consisting mainly of Cr and Mo and, as a result, good crystallinity of the magnetic layers is obtained and magnetic coercive force is further improved. This effect is particularly remarkable in inline spattering machines.

The magnetic recording media according to the first embodiment of the present invention may comprise, in addition to the magnetic layers and the non-magnetic spacer layers described above, underlying layers, protective layers, lubricating layers and the like. As these underlayers, protective layers, lubricating layers and the like, conventional ones may be used as they are.

The underlayers are usually provided between the substrates and the magnetic layers to improve magnetic characteristics of the magnetic layers. The underlayers preferably composed of a material capable of providing high magnetic coercive force. The underlayers may be constituted by one or more layers. As the underlayers, for example, two-layer films of Cr and CrMo, two-layer films of Cr and the like may be used. Among these, two-layer films of Cr (substrate side) and CrMo (magnetic layer side) provide higher magnetic coercive force. In particular, those having a CoMo film thickness of about 30 to 80 Å and thickness of Cr film provided thereunder of about 100 to 800 Å are capable of providing particularly excellent coercive force and hence preferred. Ratio of thickness of CrMo layer/Cr layer is preferably within a range of about 0.05 to 0.3. Magnetic coercive force of two-layer films of Cr is slightly lower than that of two-layer films of Cr and CrMo, but it is still sufficient for practical use. Two-layer films of CrMo may also be used as the underlayers.

Instead of those mentioned above or in addition to the above-described two-layer films of Cr and CrMo, Al layers may also be used as the underlayers.

The protective layers are provided on the magnetic layers (surfaces opposite to the substrates) in order to protect the magnetic layers from destruction due to sliding movement of heads contacting with the magnetic layers. The protective layers may be constituted by one or more layers. Examples of the protective layers include silicon oxide layers, carbon layers, zirconia layers, hydrogenated carbon layers, silicon nitride layers, SiC layers and the like.

The lubricating layers are provided to reduce frictional resistance against sliding heads, and perfluoropolyethers and the like are generally used.

Magnetic Recording Media of the Second and Third Embodiments

The magnetic recording media according to the second and third embodiments of the present invention comprise a group of CoPt magnetic layers consisting of two or more magnetic layers and non-magnetic spacer layers are provided between the magnetic layers and at least one of the non-magnetic spacer layers is a layer composed of a material consisting mainly of Cr and Mo.

The magnetic layers consist of CoPt alloys, i.e., alloys consisting mainly of Co and Pt. The alloys consisting mainly of Co and Pt preferably contain about 70 at % or more of Co and Pt in total in order to obtain sufficient magnetic coercive force. While ratio of Co and Pt is not particularly limited, the ratio Pt/Co (at %) is preferably within a range of about 0.07 to 0.2 in view of magnetic coercive force, noise and cost.

Components other than Co and Pt are not particularly limited and one or more components may be selected from the group of Cr, Ta, Ni, Si, B, O, N, Nb, Mn, Mo, Zn, W, Pb, Re, V, Sm and Zr. The amount of these elements may desirably be decided in view of magnetic characteristics and the like and, in general, it is suitably equal to about 30 at % or less. More specifically, CoPtCr alloys, CoPtTa alloys, CoPtCrB alloys, CoPtCrTa alloys, CoPtCrNi alloys and the like can be mentioned as examples of the materials of the magnetic layers.

One ore more of the non-magnetic spacer layers are composed of alloys consisting mainly of Cr and Mo. The non-magnetic spacer layers which are composed of materials mainly consisting of Cr and Mo will be referred to hereinafter as "CrMo non-magnetic spacer layers".

When the CrMo non-magnetic spacer layers consist solely of Cr and Mo, it is preferred that amount of Mo added to Cr metal is about 40 at % or less in order to obtain layers having uniform crystalline particle systems and good crystallinity.

Instead of a part of Mo, they may also contain one or more elements selected from, for example, Zr, W, B, V, Nb, Ta, Fe, Ni, Re, Ce, Zn, P, Si, Ga, Hf, Al and Ti. It is suitable that the total amount of these elements and Mo is about 40 at % or less in order to obtain layers having uniform crystalline particle systems and good crystallinity.

However, amounts of Mo and other elements added to Cr may desirably be adjusted depending on contents of Co and Pt and contents and kinds of other elements contained in the magnetic layers.

For example, when CoPtCr alloy magnetic layers have a Pt content of about 4 to 20 at % and a Cr content of about 3 to 30 at % and CrMo non-magnetic spacer layers immediately under the CoPtCr alloy magnetic layers are composed of CrMo, the CrMo non-magnetic spacer layers preferably have a Mo content of about 2 to 20 at % since such a Mo content yields uniform crystalline particle size and good crystallinity of the magnetic layers and the CrMo non-magnetic spacer layers and it makes it easy to control the difference of crystalline lattice constants of the CrMo non-magnetic spacer layers and the magnetic layers within a suitable range. Particularly preferred Mo content for obtaining a high Hc and S/N ratio is about 5 to 10 at %.

CoMoZr alloys are preferably used as the CrMo non-magnetic spacer layers to obtain a high Hc, Mr $\delta$ and S/N ratio, since addition of Zr to CrMo alloys further enhance the noise reduction effect and hence the S/N ratio is improved. To obtain this effect, a Zr content within a range of about 2 to 5 at % is preferably employed.

The number of the magnetic layers constituting the group of magnetic layers may be decided to be more than two layers, for example, three layers, four layers, five layers or the like in view of reproducing output, overwriting characteristics and the like while they usually have around five layers at most for practical use. However, they, of course, may have six or more magnetic layers, if desired.

The magnetic recording media according to the second and third embodiments of the present invention comprise one or more non-magnetic spacer layers between the two or more magnetic layers. At least one of the non-magnetic spacer layers is a CrMo non-magnetic spacer layer.

The non-magnetic spacer layers are usually provided directly between the magnetic layers. However, if necessary, other layers may be provided between the magnetic layers and the non-magnetic spacer layers provided thereon. When three or more magnetic layers are provided, it is preferred that every two adjacent magnetic layers have a non-magnetic spacer layer between them. In such a case, the number of the magnetic layers is (N), the number of the non-magnetic spacer layers should be (N–1). However, when three or more magnetic layers are provided, every two adjacent magnetic layer may not have a non-magnetic layer between them as the case may be and at least one non-magnetic layer may be provided between the magnetic layers.

Layer structure may be, for example, magnetic layer/non-magnetic spacer layer/magnetic layer, magnetic layer/non-magnetic spacer layer/magnetic layer/non-magnetic spacer layer/magnetic layer, magnetic layer/non-magnetic intermediate layer/magnetic layer/non-magnetic spacer layer/magnetic layer/non-magnetic spacer layer/magnetic layer or the like. The number of the combination of the magnetic layers and the non-magnetic layers may optionally be increased. Material and thickness of magnetic layers may be identical or different from one another. Similarly, when two or more non-magnetic spacer layers are provided, materials and thicknesses of non-magnetic layers may be identical or different from one another.

Thickness of each magnetic layer may suitably be about 20 to 230 Å, preferably about 40 to 150 Å. When it is blow 20 Å, sufficient magnetic coercive force can not be obtained and, when it exceeds 230 Å, overwriting characteristics tend to be deteriorated and medium noise tends to be increased. Thickness of each non-magnetic spacer layer may suitably be about 10 to 100 Å, preferably about 30 to 80 Å. When it is blow 10 Å, sufficient magnetic coercive force can not be obtained and, when it exceeds 100 Å, there would be tendencies that output is lowered, overwriting characteristics are deteriorated and medium noise is increased.

In the magnetic recording media of the present invention described above, it is suitable that difference $(d_{(002)}-d_{(110)})$ obtained by subtracting crystalline lattice spacings of bcc (110) faces in the CrMo non-magnetic spacer layers from crystalline lattice spacings of hcp (002) faces in the magnetic layers immediately above the non-magnetic spacer layers falls within a range of about 0.002 to 0.032 Å. When the difference $(d_{(002)}-d_{(110)})$ is below 0.002 Å or exceeds 0.032 Å, Hc and S/N ratio are lowered.

When two or more CrMo non-magnetic spacer layers are provided, the difference $(d_{(002)}-d_{(110)})$ may independently be about 0.002 to 0.032 Å for each of the non-magnetic spacer layers.

Further, to obtain a high S/N ratio, the difference $(d_{(002)}-d_{(110)})$ obtained by subtracting crystalline lattice spacings of bcc (110) faces in the CrMo non-magnetic spacer layers from crystalline lattice spacing of hcp (002) faces in the magnetic layers preferably falls within a range of about 0.014 to 0.030 Å.

When two or more CrMo non-magnetic spacer layers are provided, it is preferred that the difference $(d_{(002)}-d_{(110)})$ is independently about 0.014 to 0.030 Å for each of the non-magnetic spacer layers.

The magnetic recording media according to the third embodiment comprise one or more non-magnetic underlayers and one of the non-magnetic underlayers which are in contact with the lowest layer of the group of CoPt magnetic layers is composed of a material consisting mainly of Cr and Mo. This non-magnetic underlayer will be referred to hereinafter as a "CrMo non-magnetic underlayer".

When the CrMo non-magnetic underlayers consist solely of Cr and Mo, it is preferred that amount of Mo added to Cr metal is about 40 at % or less in order to obtain films having uniform crystalline particle systems and good crystallinity.

Instead of a part of Mo, they may also contain one or more elements selected from, for example, Zr, W, B, V, Nb, Ta, Fe, Ni, Re, Ce, Zn, P, Si, Ga, Hf, Al and Ti. It is suitable that total amount of these elements and Mo is about 40 at % or less in order to obtain films having uniform crystalline particle systems and good crystallinity.

However, amounts of Mo and other elements added to Cr may desirably be adjusted depending on contents of Co and Pt and contents and kinds of other elements contained in the magnetic layers contacting with the CrMo non-magnetic underlayer.

For example, when CoPtCr alloy magnetic layers have a Pt content of about 4 to 20 at % and a Cr content of about 3 to 30 at % and CrMo non-magnetic underlayers immediately under the CoPtCr alloy magnetic layers are composed of CrMo alloys, the CrMo non-magnetic underlayers preferably have a Mo content of about 2 to 20 at % since such a Mo content yields uniform crystalline particle sizes and good crystallinity of the magnetic layers and the CrMo non-magnetic underlayers, and it makes it easy to control the difference of crystalline lattice constants of the CrMo non-magnetic underlayers and the magnetic layers within a suitable range. Particularly preferred Mo content for obtaining a high Hc and S/N ratio is about 5 to 10 at %.

Thickness of the CrMo non-magnetic underlayers may suitably be in a range of about 10 to 150 Å. The upper and lower limits of the thickness of the CrMo non-magnetic underlayers are decided so that layers having uniform crystalline particle sizes and good crystallinity as well as crystalline lattice spacings suitable for the magnetic layers are obtained. In view of these factors, thickness of the CrMo non-magnetic underlayers is preferably in a range of about 20 to 100 Å.

CoMoZr alloys are preferably used as the CrMo non-magnetic underlayers to obtain a high Hc, Hrδ and S/N ratio, since addition of Zr to CrMo alloys further enhance the noise reduction effect and hence the S/N ratio is improved. To obtain this effect, a Zr content within a range of about 2 to 5 at % is preferably employed.

This effect is influenced also by thickness of the layers and thickness of the CrMozr non-magnetic underlayers may be in a range of about 10 to 150 Å, preferably in a range of about 20 to 100 Å. When it is blow 10 Å, sufficient Hc can not be obtained and, when it exceeds 150 Å, there would be tendencies that output is lowered, overwriting characteristics are deteriorated and medium noise is increased.

In the magnetic recording media according to the third embodiment of the present invention, difference $(d_{(002)}-d_{(110)})$ obtained by subtracting crystalline lattice spacings of bcc (110) faces in the CrMo non-magnetic underlayers from crystalline lattice spacings of hcp (002) faces in the magnetic layers in contact with the above CrMo non-magnetic underlayers falls within a range of about 0.002 to 0.032 Å. When the difference $(d_{(002)}-d_{(110)})$ is below 0.002 Å or exceeds 0.032 Å, Hc and S/N ratio are lowered. Further, to obtain a high S/N ratio, the difference $(d_{(002)}-d_{(110)})$ preferably falls within a range of about 0.014 to 0.030 Å.

The magnetic recording media according to the third embodiment of the present invention may further have one or more non-magnetic underlayers between the CrMo non-magnetic underlayers and the substrates. The non-magnetic underlayers which are in contact with the CrMo non-magnetic underlayers preferably composed of metals having body-centered cubic close-packed crystalline structures. An example of the non-magnetic underlayers composed of metals having body-centered cubic close-packed crystalline structures is a Cr underlayer. The non-magnetic underlayer which are in contact with the CrMo non-magnetic underlayer are preferably metal layers having uniform particle sizes and good crystallinity, and it was experimentally confirmed that the most preferred is a Cr layer. Examples of metals having body-centered cubic close-packed crystalline structures other than Cr include Ti, Ta and Zr.

Thickness of the non-magnetic underlayers composed of metals having body-centered cubic close-packed crystalline structures may suitably be in a range of about 100 to 1000 Å. The upper and lower limits of thickness of the non-magnetic underlayers are decided so that the layers have uniform particle sizes and good crystallinity. In particular, in order to obtain a high Hc and S/N ratio, thickness of the non-magnetic underlayer is preferably in a range of about 100 to 800 Å. Further, ratios of [thickness of the CrMo non-magnetic underlayers]/[thickness of the non-magnetic underlayers composed of metals having body-centered cubic close-packed crystalline structures] are preferably in a range of about 0.05 to 0.5 since such ratios provide a high Hc and S/N ratio.

In the magnetic recording media according to the third embodiment of the present invention, other non-magnetic underlayers may be provided between the non-magnetic underlayers composed of metals having body-centered cubic close-packed crystalline structures and the non-magnetic substrates. Examples of such non-magnetic underlayers include Al, Ti and Zr layers. Thickness of these non-magnetic underlayers may be, for example, in a range of about 10 to 100 Å. The upper and lower limits of thickness of the non-magnetic underlayers are decided so that the non-magnetic underlayers composed of metals having body-centered cubic close-packed crystalline structures, which are laminated thereon, have uniform particle sizes and good crystallinity. Further, to obtain a high Hc and S/N ratio, the thickness is preferably in a range of about 30 to 80 Å.

The magnetic recording media according to the second and third embodiments of the present invention may further have protective layers and lubricating layers similar to those explained for the magnetic recording media of the first embodiment on the CoPt magnetic layers.

Like in the magnetic recording media of the first embodiment, materials and shapes of the substrates are not particularly limited so long as they are non-magnetic substrates. For example, glass substrates, crystallized glass substrates, aluminium substrates, ceramic substrates, carbon substrates, silicon substrates and the like may be used.

The magnetic recording media according to the second embodiment of the present invention may be manufactured by utilizing conventional techniques for forming thin films such as spattering techniques. In particular, by adjusting compositions of the CrMo non-magnetic spacer layers and adjusting preparation conditions of the CrMo non-magnetic spacer layers and the CoPt magnetic layers, magnetic recording media having differences of crystalline lattice spacings ($d_{(002)}-d_{(110)}$) within a desired range can be obtained.

The magnetic recording media according to the third embodiment of the present invention may also be manufactured by utilizing conventional techniques for forming thin films such as spattering techniques. In particular, by adjusting compositions of the CrMo non-magnetic underlayers and the CrMo non-magnetic spacer layers and adjusting preparation conditions of the CrMo non-magnetic underlayers, the CrMo non-magnetic spacer layers and the CoPt magnetic layers, magnetic recording media having difference of crystalline lattice spacings ($d_{(002)}-d_{(110)}$) within a desired range can be obtained.

For example, by forming at least the CrMo non-magnetic underlayers and/or the CrMo non-magnetic spacer layers and the CoPt magnetic layers through a spattering technique under conditions of a substrate heating temperature within a range of about 250 to 425° C. and an Ar gas pressure within a range of about 0.5 to 10 mTorr, magnetic recording media having difference of crystalline lattice spacings ($d_{(002)}-d_{(110)}$) within a desired range can be obtained. The substrate heating temperature is preferably within a range of about 300 to 400° C. The Ar gas pressure is preferably in a range of about 1 to 8 mTorr.

The magnetic recorders of the present invention will be explained hereinafter.

The magnetic recording media of the present invention described above are suitably used as magnetic disks, in particular, in magnetic recorders having magnetoresistive type heads.

Figure 3:
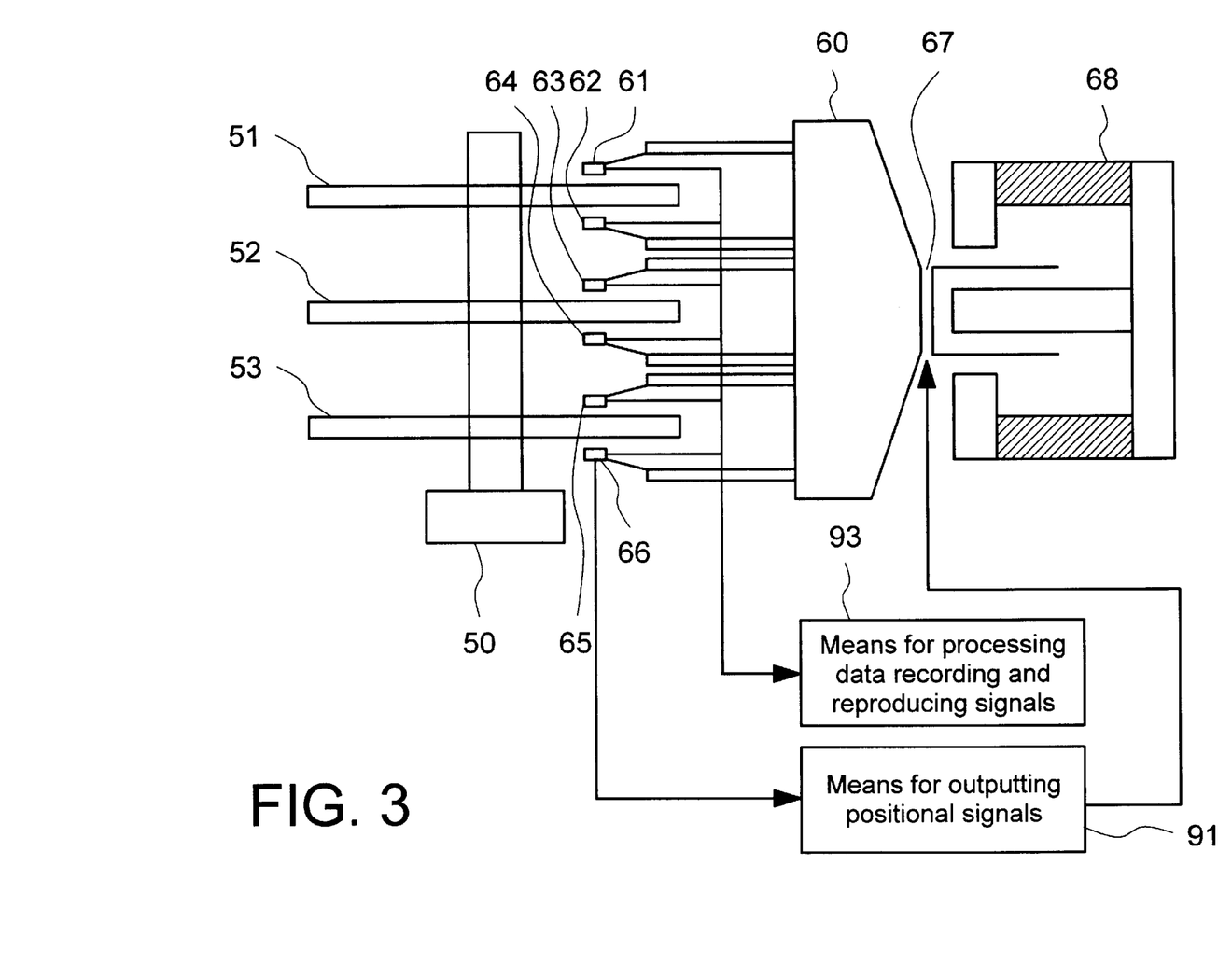
FIG. 3 is a schematic view of a magnetic recorder of the present invention.

The magnetic recorders of the present invention comprise one or more magnetic disks and magnetoresistive type heads for recording and reproducing magnetic information into or from the magnetic disks. A specific example of the recorders is shown in FIG. 3.

In the figure, reference numbers 51 to 53 denote magnetic recording media of the present invention (disks) which are fixed on a shaft of a spindle motor 50. When the shaft of the spindle motor 50 rotates, the magnetic disks 51 to 53 rotate, too. The lower surface of the magnetic disk 53 may also be used as a servo surface. A head moving means 60 is capable of moving locations of heads to desired tracks by rotation around its shaft. Magnetic heads 61 to 65 and, if necessary, a servo magnetic head 66 are provided at ends of arms extending from the head moving means 60. The magnetic heads 61 to 65 are thin layer heads in which magnetoresistive elements are embedded for reproducing only. The servo magnetic head 66 is a head for reading servo information only.

A voice coil 67 is provided on the head moving means 60 at the opposite side of the magnetic heads. The voice coil 67 is inserted into a linear actuator magnet assembly 68 to control a current to be flown in the voice coil 67 and make it possible to rotate the head moving means 60.

When the recorder of the present invention have the servo magnetic head 66, the servo magnetic head 66 is always reading servo information while the recorder is operated. The servo information represents information of current sectors, tracks and the like. Read servo information is transmitted to a means for outputting positional signals 91. The means for outputting positional signals 91 controls the current to be flown in the voice coil 67 to move the magnetic heads 61 to 65 to desired tracks and outputs track information as positional information.

Since the magnetic recording media of the present invention show low medium noise, they are useful as magnetic disks, magnetic tapes and the like. Further, the magnetic recording media of the present invention show further reduced medium noise, high magnetic coercive force, squareness ratio and further improved overwriting characteristics depending on their constructions.

In addition, since the magnetic recording media of the present invention show low medium noise, they are useful as magnetic recording media for MR (magnetoresistive type) heads.

According to the present invention, there can be provided magnetic recording media showing low noise, excellent magnetic coercive force, excellent corrosion resistance, excellent deviation characteristics, remarkable improvement of magnetic coercive force by heat treatment after film forming and excellent overwriting characteristics OW (dB). The magnetic recording media of the present invention showing these characteristics are particularly suitable for recording and reproducing by magnetoresistive heads.

According to the present invention, there can be further provided magnetic recording media showing more excellent magnetostatic characteristics (magnetic coercive force, residual magnetization film thickness product) and recording and reproducing characteristics (S/N ratio, OW) compared with conventional magnetic recording media constituted by combinations of Cr underlayers, Cr non-magnetic spacer layers and CoPt alloy magnetic layers as well as showing a high output, low medium noise and excellent overwriting characteristics in recording and reproducing even at a surface recording density of more than 600 Mb/in$^2$.

According to the present invention, there can be further provided magnetic recorders showing a high S/N ratio upon recording signals, large recording capacity and excellent environmental condition resistance.

DESCRIPTION OF PREFERRED EMBODIMENTS

The magnetic recording media of the present invention will be further explained by referring to the following working examples hereinafter.

Example 1

Figure 1:
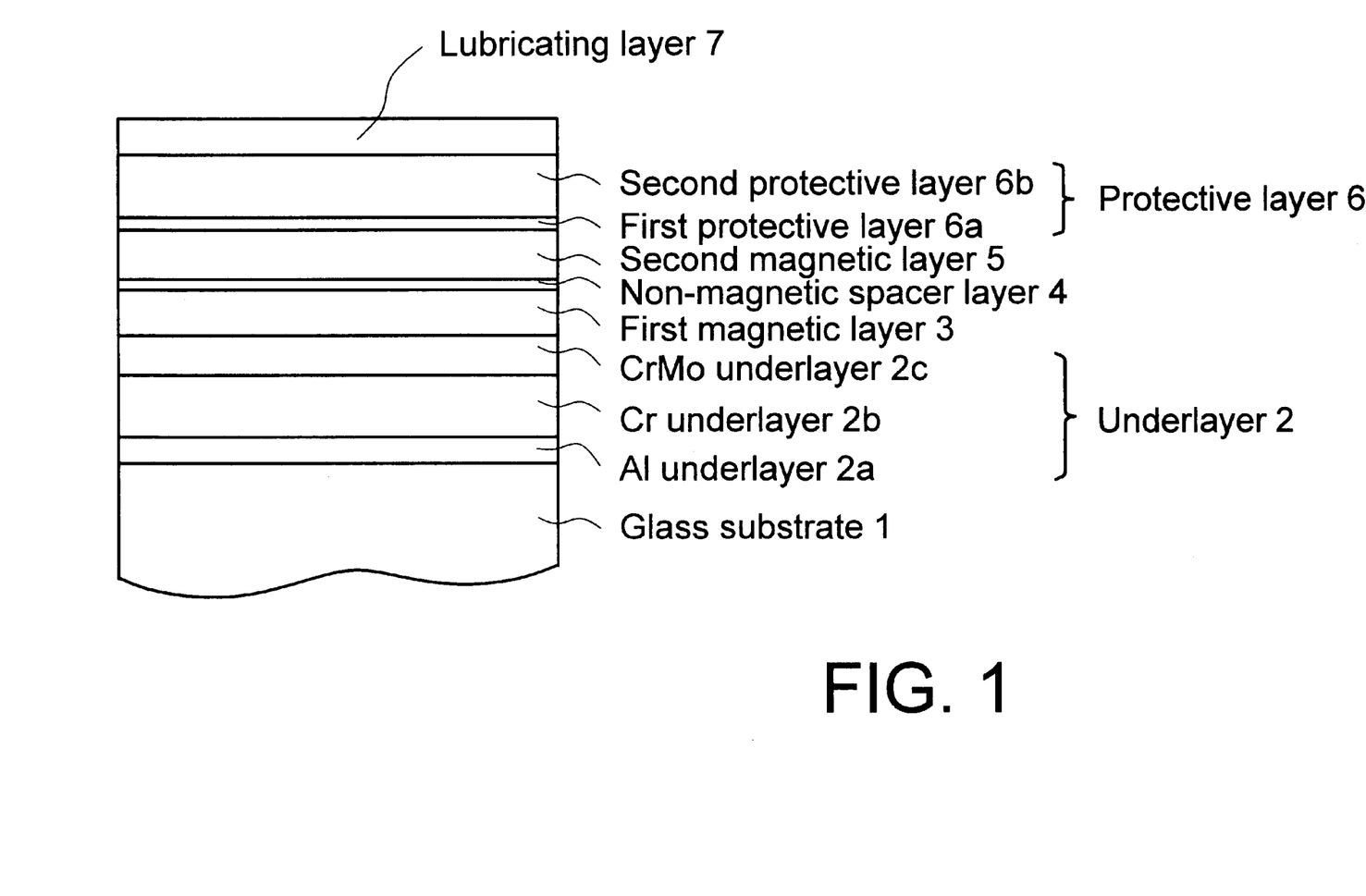
FIG. 1 is a partial cross sectional view of a magnetic disk of the present invention.

The magnetic recording medium of this example is a magnetic disk consisting of, as shown in FIG. 1, an underlayer 2, first magnetic layer 3, non-magnetic spacer layer 4, second magnetic layer 5, protective layer 6 and lubricating layer 7, which were laminated on a glass substrate 1 in that order.

The glass substrate 1 was composed of aluminosilicate glass and its surface had been ground as a mirror surface so that it had an Ra of about 50 Å.

The underlayer 2 consisted of, from the glass substrate 1 side, Al film 2a (thickness; about 50 Å), Cr film 2b (thickness; about 400 Å, two-layer structure of about 200 Å and about 200 Å) and CrMo film 2c (thickness; about 100 Å). This underlayer 2 was provided in order to improve crystalline structure of the magnetic layer. The CrMo film 2c was composed of 98 at % of Cr and 2 at % of Mo.

The first and second magnetic layers 3 and 5 are composed of the same film material of CoPtCr alloy and the both had a thickness of about 120 Å. Co, Pt and Cr contents of these magnetic layers were 78%, 11% and 11 at %, respectively.

The non-magnetic spacer layer 4 provided between the first and second magnetic layers 3 and 5 was composed of CrMo alloy, which comprised 95 at % of Cr and 5 at % of Mo, and had a thickness of about 50 Å.

The protective layer 6 was provided in order to prevent deterioration of the magnetic layers by contact with magnetic heads and consisted of two layers, from the side of the magnetic layers, a first protective layer 6a and second protective layer 6b. The first protective layer 6a was composed of a Cr film having a thickness of about 50 Å and acted as chemical protection layer of the magnetic layers. The other second protective layer 6b was composed of a silicon oxide film having a thickness of about 160 Å, in which hard microparticles are dispersed, and wear resistance was provided by this protective layer 6b.

The lubricating layer 7 was composed of perfluoropolyether and direct contact of the medium with magnetic heads was obviated by this layer.

A process utilized for producing the magnetic disk having the construction described above will be explained hereinafter.

First, a main surface of the glass substrate 1 chemically reinforced by ion exchange was made into a mirror surface (Ra=about 50Å) by precise grinding. Then, on the main surface of this glass substrate 1, the Al film 2a, Cr film 2b, CrMo film 2c, first magnetic layer 3, non-magnetic layer 4, second magnetic layer 5 and protective layer 6 were successively formed in this order by inline spattering techniques. After the first protective layer 6a was made hydrophilic, the substrate was applied by spin coating with a solution of organosilicon compound (a mixture of water, isopropyl alcohol and tetraethoxysilane) in which silica microparticles (particle size; about 100 Å) were dispersed and sintered to form the second protective layer 6b. Finally, the substrate was dipped into a lubricating agent comprising perfluoropolyether to form the lubricating layer 7 on the second protective layer 6b.

Good results were obtained in running test of the disk obtained above, which was carried out with a head flying height of less than 3 μm. Magnetic coercive force, residual magnetization film thickness product, S/N ratio and corrosion resistance of the disk were evaluated. Results are shown in Table 1.

Examples 2 to 11

In Examples 2 to 9, magnetic disks were produced in a manner similar to that of Example 1 except that composition of CrMo alloys and thickness of the CrMo non-magnetic spacer layers were changed. In Examples 10 and 11, magnetic disks were produced in a manner similar to that of Example 1 except that the non-magnetic layers having a thickness of about 50Å and composed of CrMoZr alloys of compositions shown in Table 1 were employed.

Good results were obtained in running tests of the disks obtained above, which were carried out with a head flying height of less than 3 μm. Magnetic coercive force, residual magnetization film thickness product, S/N ratio and corrosion resistance of the disks were evaluated. Results are shown in Table 1.

TABLE 1

| Example | Non-magnetic spacer layer | Thickness | Hc[1] | Mrδ[2] | S/N ratio | Corrosion resistance |
|---|---|---|---|---|---|---|
| 1 | $Cr_{98}Mo_2$ | 50 | 1900 | 0.97 | 33.7 | good |
| 2 | $Cr_{98}Mo_2$ | 80 | 1950 | 0.94 | 34.0 | good |
| 3 | $Cr_{95}Mo_5$ | 50 | 1950 | 1.00 | 33.8 | good |
| 4 | $Cr_{95}Mo_5$ | 100 | 2000 | 0.92 | 34.2 | good |
| 5 | $Cr_{90}Mo_{10}$ | 50 | 1950 | 0.97 | 33.7 | good |
| 6 | $Cr_{85}Mo_{15}$ | 50 | 1900 | 0.97 | 33.6 | good |
| 7 | $Cr_{80}Mo_{20}$ | 50 | 1900 | 0.97 | 33.9 | good |
| 8 | $Cr_{60}Mo_{40}$ | 50 | 1730 | 0.92 | 32.9 | good |
| 9 | $Cr_{40}Mo_{60}$ | 50 | 1700 | 0.90 | 32.3 | good |
| 10 | $Cr_{90}Mo_8Zr_2$ | 50 | 2050 | 0.97 | 35.0 | good |
| 11 | $Cr_{87}Mo_{12}Zr_1$ | 50 | 2020 | 0.97 | 34.8 | good |
| Comparative Example | | | | | | |
| 1 | Cr | 50 | 1650 | 0.86 | 31.5 | bad |
| 2 | $Cr_{90}W_{10}$ | 50 | 1700 | 0.88 | 32.0 | bad |
| 3 | $Cr_{90}Ti_{10}$ | 50 | 1550 | 0.70 | 28.3 | bad |

[1]Magnetic coercive force
[2]Residual magnetization film thickness product
* Composition of magnetic film materials: at %, film thickness: Å, magnetic coercive force Hc: Oe, residual magnetization film thickness product Mr δ: menu/cm², S/N ratio: dB.
* Test method of corrosion resistance: Recording and Reproducing tests are carried out after samples have been left for 10 days at 80° C. and 80% Rh. Good represents no increase of errors and bad represents increase of errors.

As seen from the results shown in Table 1, those utilizing CrMo or CrMoZr alloys showed more excellent magnetic coercive forces, higher residual magnetization film thickness products and lower noises as well as more excellent corrosion resistance compared with the comparative examples. Further, it was also found that particularly low noises can be obtained at a Mo content of about 2 to 30 at % while good magnetic coercive forces and higher residual magnetization film thickness products are maintained. Particularly preferred Mo content was about 5 to 15 at %.

It is also seen that the noise reduction effect is enhanced by adding Zr to the CrMo alloys. To obtain such an effect, Zr is preferably contained in an amount of about 2 to 5% by weight. These properties may also be influenced by film thicknesses and the films of CrMo alloys and CrMoZr alloys preferably have a thickness of about 10 to 100 Å, particularly preferably about 30 to 80 Å. When thicknesses are below 10 Å, sufficient magnetic coercive force cannot be obtained and, when they exceed 100 Å, there may be tendencies that output is lowered, overwriting characteristics are deteriorated and noise is increased.

Even though Cr alloys are used like in the present invention, the advantages of the present invention cannot be obtained if the non-magnetic spacer layers are composed of CrW or CrTi. That is, though CrW may improve magnetic coercive force compared with Cr, CrW shows less noise reduction effect compared with CrMo and both of magnetic coercive force and noise reduction effect of CrTi are inferior to those of Cr.

Examples 12 to 18

Magnetic disks comprising the same non-magnetic spacer layers as in Example 1 were produced in a manner similar to that of Example 1 except that different film compositions or materials were used for the first and second magnetic layers 3 and 5. Obtained disks were tested with respect to the same properties as in Example 1. Results are shown in Table 2.

TABLE 2

| Example | Magnetic layer | Thickness | Hc[1] | Mrδ[2] | S/N ratio | Corrosion resistance |
|---|---|---|---|---|---|---|
| 12 | $Co_{95}Pt_{10}Cr_5$ | 120 | 1880 | 1.10 | 32.7 | good |
| 13 | $Co_{74}Pt_{15}Cr_{11}$ | 120 | 2130 | 0.90 | 33.1 | good |
| 14 | $Co_{71}Pt_{12}Cr_{17}$ | 120 | 2130 | 0.68 | 34.3 | good |
| 15 | $Co_{68}Pt_8Cr_{18}Ta_6$ | 120 | 2100 | 0.63 | 35.6 | good |
| 16 | $Co_{88}Pt_{10}Ta_2$ | 120 | 1850 | 1.15 | 32.4 | good |
| 17 | $Co_{83}Pt_{12}Ta_5$ | 120 | 1910 | 0.97 | 32.0 | good |
| 18 | $Co_{72}Pt_{10}Cr_{14}Ta_4$ | 120 | 2020 | 0.91 | 35.1 | good |

[1] Magnetic coercive force
[2] Residual magnetization film thickness product
* Composition of magnetic film materials: at %, film thickness: Å, magnetic coercive force Hc: Oe, residual magnetization film thickness product Mrδ: menu/cm², S/N ratio: dB.
* Test method of corrosion resistance: Recording and Reading tests are carried out after samples have been left for 10 days at 80° C. and 80% Rh. Good represents no increase of errors and bad represents increase of errors.

As seen from the results of Table 2, when non-magnetic layers of CrMo alloys are used to reduce noises, CoPtCr alloy magnetic layers preferably have Co, Pt and Cr contents of about 62 to 90 at %, about 5 to 20 at % and about 5 to 18 at %, respectively. When the magnetic layers are composed of CoPtTa alloys, they preferably have Co, Pt and Ta contents of about 94 to 73 at %, about 5 to 20 at % and about 1 to 7 at %, respectively. When the magnetic layers are composed of CoPtCrTa alloys, they preferably have Co, Pt, Cr and Ta contents of about 55 to 89 at %, about 5 to 20 at %, about 5 to 18 at % and about 1 to 7 at %, respectively. Each of these magnetic layers preferably has a thickness of about 80 to 180 Å.

Example 19

The magnetic recording medium of this example was a magnetic disk consisting of, as shown in FIG. 1, an underlayer 2, first magnetic layer 3, non-magnetic spacer layer 4, second magnetic layer 5, protective layer 6 and lubricating layer 7, which were laminated on a glass substrate 1 in that order.

The glass substrate 1 was composed of aluminosilicate glass and its surface had been ground as a mirror surface so that it had an Ra of about 50 Å.

The underlayer 2 consisted of, from the glass substrate 1 side, an Al film 2a (thickness; about 50 Å), Cr film 2b (thickness; about 600 Å) and CrMo film 2c (thickness; about 50 Å). The CrMo film was composed of 98 at % of Cr and 2 at % of Mo.

The first and second magnetic layers 3 and 5 are composed of the same film material of CoPtCr alloy (Co: 78 at %, Pt: 11 at %, Cr: 11 at %) and the both had a thickness of about 120 Å.

The non-magnetic layer 4 provided between the first and second magnetic layers 3 and 5 was composed of CrMo alloy (Cr: 98 at %, Mo: 2 at %) and had a thickness of about 50 Å.

The protective layer 6 consisted of, from the side of the substrate, a first protective layer 6a and second protective layer 6b. The first protective layer 6a was composed of a Cr film having a thickness of about 50 Å and acted as chemical protection layer of the magnetic layer. The other second protective layer 6b was composed of a silicon oxide film having a thickness of about 160 Å, in which hard microparticles are dispersed, and wear resistance was provided by this protective layer 6b.

The lubricating layer 7 was composed of perfluoropolyether and direct contact of the medium with magnetic heads was obviated by this layer.

A process utilized for producing the magnetic disk having the construction described above will be explained hereinafter.

Figure 2:
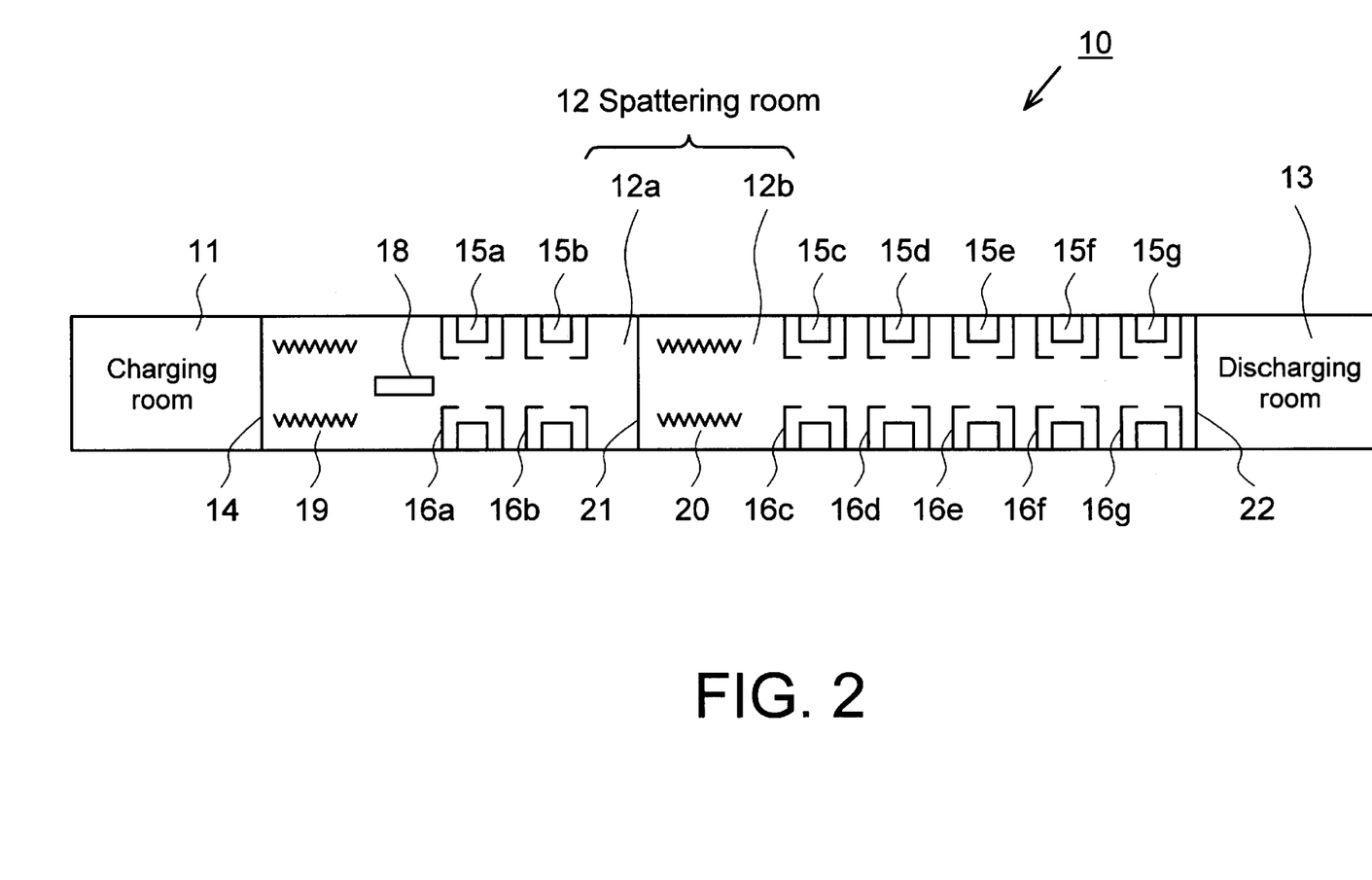
FIG. 2 is a schematic view of the inline type spattering machine used in the working examples described herein.

The substrate described above was mounted on a substrate holder (pallet), the pallet 18 was introduced into charging room 11 of an inline spattering apparatus 10 shown in FIG. 2 and then the inside of the charging room was evacuated from atmospheric pressure to a degree of vacuum similar to that of a spattering room (vacuum chamber) 12. Then, a partition 14 was opened and the pallet 18 was introduced into a first vacuum chamber 12a. In this first vacuum chamber 12a, the glass substrate mounted on the pallet 18 was heated to about 300° C. for 1 minute by a lamp heater 19 and the pallet 18 was transferred at a speed of 1.2 m/minute between facing targets 16a and 16a and 15a and 15b in discharging state successively at an Ar gas pressure of 5 mTorr. The targets consisted of Al and Cr in this order in the transferring direction and the Al underlayers 2a and the Cr underlayers 2b were formed on both sides of the glass substrate in this order according to the order of the targets. Spattering was carried out at input powers of 300 W for the Al targets and 1.0 kW for the Cr targets.

Then, the pallet 18 was transferred to a second vacuum chamber 12b through a port 21 and the substrate was heated again by a heater 20 provided in the second vacuum chamber 12b. The heating was performed at about 375° C. for 1 minute. Then, the pallet 18 was passed between discharging targets 15c and 16c to 15g and 16g, which were consisted of CrMo targets 15c and 16c, CoPtCr targets 15d and 16d, CrMo targets 15e and 16e, CrPtCr targets 15f and 16f and Cr targets 15g and 16g arranged in this order, with a transferring speed of 1.2 m/minute successively at an Ar gas pressure of 1.3 mTorr.

As a result, the CrMo underlayers 2c, CrPtCr first magnetic layers 3, CrMo non-magnetic spacer layers 4, CrPtCr second magnetic layers 5 and Cr first protective layer 6a were laminated according to the order of the aligned targets. Spattering was carried out at input powers of 500 W for the CrMo targets, 300 W for the CoPtCr targets and 500 W for the Cr targets. Final pressure (degree of vacuum) in the first and second vacuum chamber was less than $5 \times 10^{-6}$ Torr.

After the formation of films by spattering described above, the first protective layer 6a was made hydrophilic by washing with IPA (isopropyl alcohol) and the substrate was immersed into a solution of organosilicon compound (a mixture of water, IPA and tetraethoxysilane) in which silica microparticles (particle size; 100 Å) were dispersed and sintered to form the second protective layer 6b composed of SiO$_2$.

Finally, the substrate was dipped into a lubricating agent comprising perfluoropolyether to form the lubricating layer 7 on the second protective layer 6b.

Good results were obtained in running test of the disk obtained above, which was carried out with a head flying height of less than 0.075 μm. Magnetic coercive force (Hc), residual magnetization film thickness product (Mr δ) and S/N ratio of the disk were evaluated. Results are shown in Table 3.

Further, composition and thickness of the CrMo underlayer 2c, composition and thickness of the CrMo non-magnetic spacer layer 4, substrate heating temperature and Ar gas pressure used for the production of the CrMo underlayer 2c and the CrMo non-magnetic spacer layer 4, difference ($d_{(002)}$–$d_{(110)}$) obtained by subtracting crystalline lattice spacing of (110) faces of the CrMo underlayer 2c from that of (002) faces of the CoPtCr magnetic layers 3 contacting with the CrMo underlayer 2c and difference ($d_{(002)}$–$d_{(110)}$) obtained by subtracting crystalline lattice spacing of (110) faces of the CrMo non-magnetic spacer layers 4 from that of (002) faces of the CoPtCr magnetic layers 5 contacting with the CrMo non-magnetic spacer layer 4 are shown in Table 3.

Since the production conditions of the underlayer 2c and the non-magnetic spacer layer 4 were the same each other and so were those of magnetic layers 3 and 5, the difference ($d_{(002)}$–$d_{(110)}$) obtained by subtracting crystalline lattice spacing of (110) faces of the CrMo underlayer 2c from that of (002) faces of the CoPtCr magnetic layer 3 contacting with the CrMo underlayer 2c and the difference ($d_{(002)}$–$d_{(110)}$) obtained by subtracting crystalline lattice spacing of (110) faces of the CrMo non-magnetic spacer layers 4 from that of (002) faces of the CoPtCr magnetic layers 5 contacting with the CrMo non-magnetic spacer layer 4 were identical to each other. Therefore, only one value representing the both were shown in Table 5. The same shall apply to Table 4.

S/N ratio was evaluated as follows. Recording and reproducing outputs at a linear recording density of 110 kfci were determined utilizing a thin film head having a magnetic head flying height of 0.060 μm at a relative speed between the thin film head and the disk of 5.0 m/second. Further, noise spectra of the magnetic disk upon signal recording and reproducing were determined by a spectrum analyzer at a carrier frequency of 13.5 MHz and a measuring band of 27 MHz. The magnetoresistive (MR) head used in this measurement had specifications of a recording track width of 4.2 μm, reproducing track width of 3.5 μm, recording gap length of 0.43 μm and reproducing gap length of 0.31 μm.

Examples 20 to 47

In Examples 20 to 43, magnetic disks were produced in a manner similar to that of Example 19 except that film composition and thickness of CrMo underlayer 2c, film composition and thickness of CrMo non-magnetic spacer layer 4, substrate heating temperature and Ar gas pressure used for the production of the CrMo underlayer 2c and the CrMo non-magnetic spacer layer 4 were changed as shown in Table 3.

In Examples 44 to 47, magnetic disks were produced in a manner similar to that of Example 19 except that the CrMo underlayers 2c and the CrMo non-magnetic spacer layers 4 had a thickness of about 50Å and were composed of CrMoZr alloys having compositions shown in Table 4.

Good results were obtained in running tests of the disks obtained above, which were carried out with a head flying height of less than 0.075 μm. Magnetic coercive force (Hc), residual magnetization film thickness product (Mr δ) and S/N ratio of the disks were evaluated. S/N ratios were determined by the same manner as in Example 19. Results are shown in Tables 3 and 4.

Further, compositions and thicknesses of the CrMo underlayers 2c, compositions and thicknesses of the CrMo non-magnetic spacer layers 4, substrate heating temperatures and Ar gas pressures used for the production of the CrMo underlayers 2c and the CrMo non-magnetic spacer layers 4, differences ($d_{(002)}$–$d_{(110)}$) obtained by subtracting crystalline lattice spacings of (110) faces of the CrMo underlayers 2c from those of (002) faces of the CoPtCr magnetic layers 3 contacting with the CrMo underlayers 2c and differences ($d_{(002)}$–$d_{(110)}$) obtained by subtracting crystalline lattice spacings of (110) faces of the CrMo non-magnetic spacer layers 4 from those of (002) faces of the CoPtCr magnetic layers 5 contacting with the CrMo non-magnetic spacer layers 4 are shown in Tables 3 and 4.

Comparative Examples 4 to 9

In Comparative Example 4, a magnetic disk was produced in a manner similar to that of Example 19 except that the non-magnetic spacer layer 4 was formed with Cr.

In Comparative Example 5, a magnetic disk was produced in a manner similar to that of Example 19 except that compositions of the CrMo underlayer 2c and the CrMo non-magnetic spacer layer 4 were changed.

In Comparative Examples 6 and 7, magnetic disks were produced in a manner similar to that of Example 19 except that substrate heating temperature and Ar gas pressure used for the production of the CrMo underlayers 2c and the CrMo non-magnetic spacer layers 4 were changed.

In Comparative Examples 8 and 9, magnetic disks were produced in a manner similar to that of Example 41 except that substrate heating temperature and Ar gas pressure used for the production of the CrMo underlayers 2c and the CrMo non-magnetic spacer layers 4 were changed.

Good results were obtained in running tests of the disks obtained above, which were carried out with a head flying height of less than 0.075 μm. Magnetic coercive force (Hc), residual magnetization film thickness product (Mr δ) and S/N ratio of the disks were evaluated. SIN ratios were determined by the same manner as in Example 19. Results are shown in Table 4.

Further, compositions and thicknesses of the CrMo underlayers 2c, compositions and thicknesses of the CrMo non-magnetic spacer layers 4, substrate heating temperatures and Ar gas pressures used for the production of the CrMo underlayers 2c and the CrMo non-magnetic spacer layers 4, differences ($d_{(002)}$–$d_{(110)}$) obtained by subtracting crystalline lattice spacings of (110) faces of the CrMo underlayers 2c from those of (002) faces of the CoPtCr magnetic layers 3 contacting with the CrMo underlayers 2c and differences ($d_{(002)}$–$d_{(110)}$) obtained by subtracting crystalline lattice spacings of (110) faces of the CrMo non-magnetic spacer layers 4 from those of (002) faces of the CoPtCr magnetic layers 5 contacting with the CrMo non-magnetic spacer layers 4 are shown in Table 4.

TABLE 3

| Example | Composition of magnetic layer (at %) 120 Å × 2 layers | Composition of underlayer 2c (at %) | Thickness of underlayer 2c (Å) | Composition of non-magnetic spacer layer 4 (Å) | Thickness of non-magnetic spacer layer 4 (Å) | Substrate heating temperature (°C.) | Ar gas pressure (mTorr) | Hc (Oe) | Mr δ (memu/cm$^2$) | S/N ratio (dB) | $d_{(002)} - d_{(110)}$ (Å) |
|---|---|---|---|---|---|---|---|---|---|---|---|
| 19 | $Co_{78}Pt_{11}Cr_{11}$ | $Cr_{98}Mo_2$ | 50 | $Cr_{98}Mo_2$ | 50 | 375 | 1.3 | 1950 | 0.97 | 35.7 | +0.029 |
| 20 | " | " | 100 | " | " | " | " | 2000 | 0.94 | 35.9 | +0.028 |
| 21 | " | " | 50 | " | " | 300 | " | 1850 | 0.95 | 35.0 | +0.032 |
| 22 | " | " | " | " | " | 375 | 5.0 | 1900 | 0.96 | 35.3 | +0.032 |
| 23 | " | $Cr_{95}Mo_5$ | 50 | $Cr_{95}Mo_5$ | 50 | 375 | 1.3 | 2050 | 1.00 | 37.1 | +0.026 |
| 24 | " | " | 100 | " | " | " | " | 2100 | 0.96 | 37.3 | +0.025 |
| 25 | " | " | 20 | " | " | " | " | 2000 | 0.94 | 37.0 | +0.027 |
| 26 | " | " | 50 | " | 20 | " | " | 2000 | 1.00 | 37.1 | +0.026 |
| 27 | " | " | " | " | 50 | 300 | " | 1950 | 0.96 | 36.3 | +0.029 |
| 28 | " | " | " | " | " | 375 | 5.0 | 1950 | 0.97 | 36.3 | +0.030 |
| 29 | " | $Cr_{90}Mo_{10}$ | 50 | $Cr_{90}Mo_{10}$ | 50 | 375 | 1.3 | 2000 | 1.00 | 36.7 | +0.015 |
| 30 | " | " | 100 | " | " | " | " | 2050 | 0.96 | 36.9 | +0.014 |
| 31 | " | " | 20 | " | " | " | " | 2000 | 0.93 | 36.8 | +0.016 |
| 32 | " | " | 50 | " | 20 | " | " | 2000 | 1.00 | 36.7 | +0.015 |
| 33 | " | " | " | " | 50 | 300 | " | 1950 | 0.97 | 36.5 | +0.019 |
| 34 | " | " | " | " | " | 375 | 5.0 | 1950 | 0.96 | 36.3 | +0.021 |
| 35 | " | $Cr_{85}Mo_{15}$ | 50 | $Cr_{85}Mo_{15}$ | 50 | 375 | 1.3 | 1950 | 0.99 | 35.5 | +0.007 |
| 36 | " | " | 100 | " | " | " | " | 2000 | 1.02 | 35.6 | +0.008 |

TABLE 4

| Example | Composition of magnetic layer (at %) 120 Å × 2 layers | Composition of underlayer 2c (at %) | Thickness of underlayer 2c (Å) | Composition of non-magnetic spacer layer 4 (Å) | Thickness of non-magnetic spacer layer 4 (Å) | Substrate heating temperature (°C.) | Ar gas pressure (mTorr) | Hc (Oe) | Mr δ (memu/cm$^2$) | S/N ratio (dB) | $d_{(002)} - d_{(110)}$ (Å) |
|---|---|---|---|---|---|---|---|---|---|---|---|
| 37 | $Co_{78}Pt_{11}Cr_{11}$ | $Cr_{85}Mo_{15}$ | 20 | $Cr_{85}Mo_{15}$ | 50 | 375 | 1.3 | 1950 | 0.95 | 35.5 | +0.007 |
| 38 | " | " | 50 | " | 20 | " | " | 1950 | 0.99 | 35.5 | +0.007 |
| 39 | " | " | " | " | 50 | 300 | " | 1850 | 0.97 | 35.1 | +0.013 |
| 40 | " | " | " | " | " | 375 | 5.0 | 1900 | 0.96 | 35.2 | +0.011 |
| 41 | " | $Cr_{80}Mo_{20}$ | 50 | $Cr_{80}Mo_{20}$ | 50 | 375 | 1.3 | 1950 | 0.97 | 35.3 | +0.002 |
| 42 | " | " | " | " | " | 300 | " | 1850 | 1.02 | 35.1 | +0.005 |
| 43 | " | " | " | " | " | 375 | 5.0 | 1900 | 0.99 | 35.2 | +0.004 |
| 44 | " | $Cr_{95}Mo_2Zr_3$ | " | $Cr_{95}Mo_2Zr_3$ | " | " | 1.3 | 2070 | 1.02 | 37.8 | +0.028 |
| 46 | " | $Cr_{92}Mo_6Zr_2$ | " | $Cr_{92}Mo_6Zr_2$ | " | " | " | 2150 | 1.01 | 38.3 | +0.025 |
| 46 | " | $Cr_{88}Mo_8Zr_4$ | " | $Cr_{88}Mo_8Zr_4$ | " | " | " | 2150 | 1.05 | 38.0 | +0.021 |
| 47 | " | $Cr_{83}Mo_{12}Zr_5$ | " | $Cr_{83}Mo_{12}Zr_5$ | " | " | " | 2100 | 1.00 | 37.8 | +0.016 |
| Comparative Examples | | | | | | | | | | | |
| 4 | $Co_{78}Pt_{11}Cr_{11}$ | Cr | 50 | Cr | 50 | 375 | 1.3 | 1700 | 0.86 | 32.5 | +0.035 |
| 5 | " | $Cr_{75}Mo_{25}$ | " | $Cr_{75}Mo_{25}$ | " | " | " | 1950 | 0.97 | 32.8 | −0.014 |
| 6 | " | $Cr_{98}Mo_2$ | " | $Cr_{98}Mo_2$ | " | 200 | " | 1800 | 1.00 | 32.8 | +0.035 |
| 7 | " | " | " | " | " | 375 | 20 | 1950 | 0.84 | 32.5 | +0.037 |
| 8 | " | $Cr_{80}Mo_{20}$ | " | $Cr_{80}Mo_{20}$ | " | 450 | 1.3 | 2000 | 0.82 | 32.3 | −0.004 |
| 9 | " | " | " | " | " | 375 | 0.2 | 1800 | 1.00 | 32.0 | −0.006 |

As seen from the results shown in Tables 3 and 4, the magnetic recording media of Examples 19 to 43 where the underlayers 2c and the non-magnetic spacer layers 4 were composed of CrMo alloys showed higher magnetic coercive forces (Hc), residual magnetization film thickness products (Mr δ) and S/N ratios compared with the magnetic recording medium of Comparative Example 4 where the underlayer 2c and the non-magnetic spacer layer 4 were composed of Cr.

Further, the magnetic recording media of Examples 44 to 47 where the underlayers 2c and the non-magnetic spacer layers 4 were composed of CrMoZr alloys showed higher magnetic coercive forces (Hc), residual magnetization film thickness products (Mr δ) and S/N ratios compared with the magnetic recording medium of Comparative Example 4 where the underlayer 2c and the non-magnetic spacer layer 4 were composed of Cr. In particular, the S/N ratios were remarkably improved because the noise reduction effect is particularly enhanced by the addition of Zr to the CrMo alloys. It can be understood that Zr content is preferably about 2 to 5 at % in order to obtain this effect.

Furthermore, by comparing the results of Examples 19 to 47 with those of Comparative Examples 5 to 9, it can be understood that the difference ($d_{(002)} - d_{(110)}$) obtained by subtracting crystalline lattice spacings of (110) faces of the underlayers 2c from those of (002) faces of the first magnetic layers 3 contacting with the underlayers 2c and the difference ($d_{(002)} - d_{(110)}$) obtained by subtracting crystalline lattice spacings of (110) faces of the non-magnetic spacer layers 4 from those of (002) faces of the second magnetic layers 5 contacting with the non-magnetic spacer layers 4 may vary depending on compositions of the underlayers 2c and the non-magnetic spacer layers 4, substrate heating temperatures and Ar gas pressures.

For example, the magnetic recording medium of Comparative Example 5 which had a Mo content in the CrMo alloys of the underlayer 2c and the non-magnetic spacer layers 4 of 25 at % showed the difference $(d_{(002)}-d_{(110)})$ of −0.014 and, as a result, showed a S/N ratio lower than those of the media of Examples 19 to 47.

These results indicate that, in order to obtain the both differences $(d_{(002)}-d_{(110)})$ within the ranges of the present invention, CrMo alloys of the underlayers 2c and the non-magnetic spacer layers 4 preferably have a Mo content of 2 to 20 at %.

Further, from the results of Comparative Examples 6 to 9, it can be understood that the $(d_{(002)}-d_{(110)})$ may significantly vary depending on substrate heating temperatures and Ar gas pressures. It is assumed that this is caused because lattice distortions are generated in the films depending on their production conditions and these lattice distortions are variously deformed depending on substrate heating temperatures and Ar gas pressures. This suggests that the $(d_{(002)}-d_{(110)})$ within the ranges of the present invention may be obtained by adjusting Mo contents of the CrMo underlayers 2c and the non-magnetic spacer layers 4 as well as substrate heating temperatures and Ar gas pressures.

The magnetic recording media of Comparative Examples 6 and 7 and Example 19 were produced by using the same compositions and film thicknesses of the underlayers 2c and the non-magnetic spacer layers 4, while using different substrate heating temperatures and Ar gas pressures. In Comparative Example 6, because of the use of a lower substrate heating temperature, the $(d_{(002)}-d_{(110)})$ became 0.035 and, as a result, Hc and SIN ratio were lowered. In Comparative Example 7, because of the use of an increased Ar gas pressure, the $(d_{(002)}-d_{(110)})$ became 0.037 and, as a result, Mr δ and SIN ratio were lowered.

The magnetic recording media of Comparative Examples 8 and 9 and Example 23 were produced by using the same compositions and film thicknesses of the underlayers 2c and the non-magnetic spacer layers 4, while using different substrate heating temperatures and Ar gas pressures. In Comparative Example 8, because of the use of a higher substrate heating temperature, both of the $(d_{(002)}-d_{(110)})$ become −0.004 and, as a result, Mr δ and S/N ratio were lowered. In Comparative Example 9, because of the use of a lower Ar gas pressure, both of the $(d_{(002)}-d_{(110)})$ became −0.006 and, as a result, Hc and S/N ratio were lowered.

Examples 48 to 64

Magnetic disks were produced in a manner similar to that of Example 19 except that combinations of compositions of the CrMo underlayers 2c and the CrMo non-magnetic spacer layers 4 shown in Table 5 were used.

Good results were obtained in running tests of the disks obtained above, which were carried out with a head flying height of less than 0.075 μm. Magnetic coercive force (Hc), residual magnetization film thickness product (Mr δ) and SIN ratio of the disks were evaluated. Measurements of S/N ratios were performed in the same manner as in Example 19. Results are shown in Table 5 together with the production conditions.

TABLE 5

| Example | Composition of magnetic layer (at %) 120 Å × 2 layers | Composition of underlayer 2c (at %) | Thickness of underlayer 2c (Å) | Composition of non-magnetic spacer layer 4 (Å) | Thickness of non-magnetic spacer layer 4 (Å) | Substrate heating temperature (°C.) | Ar gas pressure (mTorr) | Hc (Oe) | Mr δ (memu/cm²) | S/N ratio (dB) | $d_{(002)}-d_{(110)}$* (Å) (1) | (2) |
|---|---|---|---|---|---|---|---|---|---|---|---|---|
| 48 | Co$_{78}$Pt$_{11}$Cr$_{11}$ | Cr$_{98}$Mo$_2$ | 50 | Cr$_{95}$Mo$_5$ | 50 | 375 | 1.3 | 1950 | 0.97 | 35.8 | +0.029 | +0.026 |
| 49 | " | " | " | Cr$_{90}$Mo$_{10}$ | " | " | " | 2000 | 0.97 | 35.7 | " | +0.015 |
| 50 | " | " | " | Cr$_{80}$Mo$_{20}$ | " | " | " | 1900 | 0.95 | 35.1 | " | +0.002 |
| 51 | " | Cr$_{95}$Mo$_5$ | " | Cr$_{98}$Mo$_2$ | " | " | " | 1900 | 0.98 | 36.0 | +0.026 | +0.029 |
| 52 | " | " | " | Cr$_{90}$Mo$_{10}$ | " | " | " | 2050 | 1.00 | 37.1 | " | +0.015 |
| 53 | " | " | " | Cr$_{85}$Mo$_{15}$ | " | " | " | 1950 | 1.00 | 36.5 | " | +0.007 |
| 54 | " | " | " | Cr$_{85}$Mo$_{20}$ | " | " | " | 1950 | 1.02 | 36.0 | " | +0.002 |
| 55 | " | Cr$_{90}$Mo$_{10}$ | " | Cr$_{98}$Mo$_2$ | " | " | " | 1950 | 0.98 | 36.1 | +0.015 | +0.029 |
| 56 | " | " | " | Cr$_{95}$Mo$_5$ | " | " | " | 2000 | 1.00 | 37.0 | " | +0.026 |
| 57 | " | " | " | Cr$_{85}$Mo$_{15}$ | " | " | " | 2000 | 0.99 | 36.2 | " | +0.007 |
| 58 | " | " | " | Cr$_{80}$Mo$_{20}$ | " | " | " | 2000 | 1.01 | 36.0 | " | +0.002 |
| 59 | " | Cr$_{85}$Mo$_{15}$ | " | Cr$_{98}$Mo$_2$ | " | " | " | 1900 | 1.00 | 35.0 | +0.007 | +0.029 |
| 60 | " | " | " | Cr$_{95}$Mo$_5$ | " | " | " | 1950 | 0.99 | 35.8 | " | +0.026 |
| 61 | " | " | " | Cr$_{90}$Mo$_{10}$ | " | " | " | 1950 | 0.98 | 35.5 | " | +0.015 |
| 62 | " | Cr$_{80}$Mo$_{20}$ | " | Cr$_{95}$Mo$_5$ | " | " | " | 1900 | 0.97 | 35.5 | +0.002 | +0.026 |
| 63 | " | " | " | Cr$_{90}$Mo$_{10}$ | " | " | " | 1900 | 0.96 | 35.4 | " | +0.015 |
| 64 | " | " | " | Cr$_{85}$Mo$_{15}$ | " | " | " | 1950 | 0.98 | 35.2 | " | +0.007 |

*(1) First magnetic layer 3 and underlying layer 2c, (2) Second magnetic layer 5 and non-magnetic intermediate layer 4

As seen from the results shown in Table 5, combinations of CrMo underlayers and CrMo non-magnetic spacer layers 4 having a Mo content of about 2 to 20 at % showed high values of Hc, Mr δ and S/N ratio.

Preferred combinations of compositions for obtaining a high S/N ratio are combinations of CrMo underlayers having a Mo content of about 2 to 20 at % and CrMo non-magnetic spacer layers having a Mo content of about 5 to 10 at % and combinations of CrMo non-magnetic spacer layers having a Mo content of about 2 to 20 at % and CrMo underlayers having a Mo content of about 5 to 10 at %. Most preferred combinations of compositions for obtaining a further higher S/N ratio are combinations of CrMo underlayers having a Mo content of about 5 to 10 at % and CrMo non-magnetic spacer layers having a Mo content of about 5 to 10 at %.

Examples 65 to 82

In Examples 65 to 74, magnetic disks were produced in a manner similar to that of Example 19 except that combinations of compositions of the magnetic layers 3, the CrMo underlayers 2c and the CrMo non-magnetic spacer layers 4 shown in Table 6 were used.

In Examples 75 to 82, magnetic disks were produced in a manner similar to that of Example 19 except that combinations of materials and compositions of the magnetic layers 3, compositions of the CrMo underlayers 2c and the CrMo non-magnetic spacer layers 4 shown in Table 6 were used.

Good results were obtained in running tests of the disks obtained above, which were carried out with a head flying height of less than 0.075 μm. Magnetic coercive force (Hc), residual magnetization film thickness product (Mr δ) and SIN ratio of the disks were evaluated. Results are shown in Table 4 together with the production conditions. Like in Table 3, only one $(d_{(002)}-d_{(110)})$ value was indicated for each Example in Table 6, because the production conditions of the underlayers 2c and the non-magnetic spacer layers 4 were the same with each other and so were those of magnetic layers 3 and 5 and hence difference $(d_{(002)}-d_{(110)})$ obtained by subtracting crystalline lattice spacings of (110) faces of the CrMo underlayers 2c from those of (002) faces of the CoPtCr magnetic layers 3 contacting with the CrMo underlayers 2c and difference $(d_{(002)}-d_{(110)})$ obtained by subtracting crystalline lattice spacings of (110) faces of the CrMo non-magnetic spacer layers 4 from those of (002) faces of the CoPtCr magnetic layers 5 contacting with the CrMo non-magnetic spacer layers 4 were identical to each other.

When the magnetic layers are composed of CoPtCrTa alloys (cf. Examples 79 to 82), a high Hc and high S/N ratio can be obtained by their Co content of 70 to 80 at %, Pt content of 5 to 15 at %, Cr content of 5 to 25 at % and Ta content of 1 to 7 at %.

Test Example 1: Corrosion Resistance Test

To evaluate corrosion resistance of magnetic disks according to the present invention, numbers of error occurrence after a certain period were determined. The magnetic recording media of Examples 1, 3, 5, 7 and 8 and Comparative Examples of 1 and 3 were used in the tests.

Under the conditions of 80° C., 80% Rh and bit length of 0.3 μm, slice levels (average output) below 65% were considered errors and their numbers were determined. Error numbers after 3000 hours are shown in Table 7.

TABLE 6

| Example | Composition of magnetic layer (at %) 120 Å × 2 layers | Composition of underlayer 2c (at %) | Thickness of underlayer 2c (Å) | Composition of non-magnetic spacer layer 4 (Å) | Thickness of non-magnetic spacer layer 4 (Å) | Substrate heating temperature (°C.) | Ar gas pressure (mTorr) | Hc (Oe) | Mr δ (memu/cm²) | S/N ratio (dB) | $d_{(002)}-d_{(110)}$ (Å) |
|---|---|---|---|---|---|---|---|---|---|---|---|
| 65 | $Co_{84}Pt_5Cr_{11}$ | $Cr_{95}Mo_5$ | 50 | the same as the underlayer 2c | 50 | 375 | 1.3 | 1850 | 1.09 | 35.5 | +0.011 |
| 66 | " | $Cr_{90}Mo_{10}$ | " | " | " | " | " | 1850 | 1.10 | 35.1 | +0.003 |
| 67 | $Co_{71}Pt_{18}Cr_{11}$ | $Cr_{95}Mo_5$ | " | " | " | " | " | 2250 | 0.88 | 35.6 | +0.032 |
| 68 | " | $Cr_{90}Mo_{10}$ | " | " | " | " | " | 2300 | 0.89 | 36.5 | +0.024 |
| 69 | $Co_{84}Pt_{11}Cr_5$ | $Cr_{95}Mo_5$ | " | " | " | " | " | 1900 | 1.09 | 35.8 | +0.031 |
| 70 | " | $Cr_{90}Mo_{10}$ | " | " | " | " | " | 1950 | 1.10 | 36.3 | +0.022 |
| 71 | $Co_{74}Pt_{11}Cr_{15}$ | $Cr_{95}Mo_5$ | " | " | " | " | " | 2150 | 0.95 | 36.5 | +0.020 |
| 72 | " | $Cr_{90}Mo_{10}$ | " | " | " | " | " | 2200 | 0.94 | 35.6 | +0.010 |
| 73 | $Co_{64}Pt_{11}Cr_{25}$ | $Cr_{95}Mo_5$ | " | " | " | " | " | 2300 | 0.82 | 35.9 | +0.013 |
| 74 | " | $Cr_{90}Mo_{10}$ | " | " | " | " | " | 2350 | 0.82 | 35.1 | +0.003 |
| 75 | $Co_{87}Pt_{11}Ta_2$ | $Cr_{95}Mo_5$ | " | " | " | " | " | 1900 | 1.10 | 34.3 | +0.028 |
| 76 | " | $Cr_{90}Mo_{10}$ | " | " | " | " | " | 1950 | 1.11 | 34.9 | +0.020 |
| 77 | $Co_{84}Pt_{11}Ta_5$ | $Cr_{95}Mo_5$ | " | " | " | " | " | 1950 | 1.01 | 34.1 | +0.032 |
| 78 | " | $Cr_{90}Mo_{10}$ | " | " | " | " | " | 1950 | 1.10 | 34.8 | +0.024 |
| 79 | $Co_{76}Pt_{11}Cr_{11}Ta_2$ | $Cr_{95}Mo_5$ | " | " | " | " | " | 2050 | 0.91 | 37.0 | +0.028 |
| 80 | $Co_{76}Pt_{11}Cr_{11}Ta_2$ | $Cr_{90}Mo_{10}$ | " | " | " | " | " | 2000 | 0.91 | 36.8 | +0.018 |
| 81 | $Co_{73}Pt_{11}Cr_{11}Ta_5$ | $Cr_{95}Mo_5$ | " | " | " | " | " | 2100 | 0.75 | 35.5 | +0.030 |
| 82 | $Co_{73}Pt_{11}Cr_{11}Ta_5$ | $Cr_{90}Mo_{10}$ | " | " | " | " | " | 2050 | 0.76 | 35.8 | +0.021 |

As seen from the results shown in Table 6, when underlayers 2c and non-magnetic spacer layers 4 composed of CrMo alloys having a Mo content of 5 to 10 at % and magnetic layers composed of CoPtCr alloys are used (cf. Examples 47 to 56), a Co content of 60 to 90 at %, Pt content of 4 to 20 at % and Cr content of 3 to 30 at % can yield a high Hc and high S/N ratio.

Further, to obtain a high Hc and high SIN ratio, the CoPtCr alloy magnetic layers suitably have a Co content of 64 to 84 at %, Pt content of 5 to 18 at % and Cr content of 5 to 25 at %.

When the magnetic layers are composed of CoPtTa alloys (cf. Examples 75 to 78), a high Hc and high S/N ratio can be obtained by their Co content of 80 to 90 at %, Pt content of 5 to 15 at % and Ta content of 1 to 7 at %.

TABLE 7

| Magnetic disc | Non-magnetic spacer layer | Number of errors | Initial number |
|---|---|---|---|
| Example 1 | $Cr_{98}Mo_2$ | 3 | 3 |
| Example 3 | $Cr_{95}Mo_5$ | 1 | 1 |
| Example 5 | $Cr_{90}Mo_{10}$ | 2 | 2 |
| Example 7 | $Cr_{80}Mo_{20}$ | 3 | 3 |
| Example 8 | $Cr_{70}Mo_{30}$ | 10 | 10 |
| Comparative Example 1 | Cr | 10 | 3 |
| Comparative Example 3 | $Cr_{90}Ti_{10}$ | 25 | 10 |

From the results of Table 7, it is seen that the magnetic disks of the present invention show less numbers of error occurrence after a certain period, i.e., they are excellent in corrosion resistance. In particular, a Mo content of about 2 to 20 at % gives particularly few numbers of error occurrence.

Test Example 2: Deviation Characteristic Test

Deviation (deviation of output within a round of disk) characteristics of magnetic disks according to the present invention were determined by a conventional method. The magnetic disks of Example 1, Comparative Examples 1 and 3 were used in the tests. Results are shown in Table 8. The term film-forming temperature in Table 8 means substrate heating temperature before the film-forming of the underlayers.

TABLE 8

| Magnetic disc | Non-magnetic spacer layer | Film-forming 200° C. | temperature 300° C. |
|---|---|---|---|
| Example 1 | $Cr_{95}Mo_5$ | 8% | 3% |
| Comparative Example 1 | Cr | 19% | 12% |
| Comparative Example 3 | $Cr_{90}Ti_{10}$ | 18% | 13% |

Test Example 3: Test for Improvement of Magnetic Coercive Force by Heating

With respect to the magnetic disks of the present invention, degrees of improvement of magnetic coercive force by heating were determined by measuring magnetic coercive force by means of a VSM (vibrating sample magnetometer). The magnetic disks of Example 1 and Comparative Example 1 were used in the tests. Results are shown in Table 9. The term "heat treatment" in Table 9 means sintering temperatures after $SiO_2$ film application.

TABLE 9

| | | Magnetic coercive force (Oe) | |
|---|---|---|---|
| Magnetic disk | Non-magnetic spacer layer | Immediately after film-forming | After heat treatment* |
| Example 1 | $Cr_{95}Mo_5$ | 1730 | 1900 |
| Comparative Example 1 | Cr | 1600 | 1650 |

*After the formation of first protective layers by spattering and second protective layers by a dipping technique, heat treatment are performed at 300° C. for 1 hour to protect the second protective layers.

Test Example 4: Overwriting Characteristic Test

To test overwriting characteristics (OW, dB) of magnetic disks according to the present invention, magnetic disks were overwitten and evaluated. Results are shown in Table 10.

Overwriting Method (1) Write at 2.5 MHz and output is represented as $V_1$.
(2) Overwrite at 10 MHz.
(3) Determine output ($V_2$) of the signal written at 2.5 MHz in the step (1) after the overwriting.

Then, OW (dB) is determined according to the following equation: OW (dB)=20 log($V_2/V_1$).

The measurements were carried out under the condition of a track width: 5 μm, coil: 24 turns, gap length: 0.27 μm and flying height: 0.05 μm.

TABLE 10

| Magnetic disk | Non-maqnetic spacer layer | Writing current (mV) | | | | |
|---|---|---|---|---|---|---|
| | | 5 | 8 | 12 | 18 | 25 |
| Example 1 | $Cr_{95}Mo_5$ | −17 | −31 | −36 | −42 | −42 |
| Comparative Example 1 | Cr | −15 | −27 | −31 | −34 | −36 |

(unit: dB)

From the results shown in Tables 7 to 10, it can be concluded that the magnetic recording media according to the first embodiment of the present invention have excellent magnetic coercive force, corrosion resistance and deviation characteristics and show significant improvement of magnetic coercive force after heat treatment and excellent overwriting characteristics OW (dB).

Test Example 5: Overwriting Evaluation Test

Overwriting characteristics (OW, dB) of magnetic disks according to the present invention were evaluated. Evaluation method is described below.

Overwriting Evaluation Method (1) Write at 3.4 MHz and output is represented as $V_1$.
(2) Overwrite at 13.5 MHz.
(3) Determine output ($V_2$) of the signal written at 3.4 MHz in the step (1) after the overwriting.

Then, OW (dB) is determined according to the following equation: OW (dB)=20 log($V_2/V_1$).

Magnetic head flying height and MR (magnetoresistive) head used were the same as those used in Example 19.

In Examples 23, 29, 83 to 88, Comparative Examples 4 and 10 to 15, magnetic disks were produced in the same manner as in Example 19 except that thickness of the magnetic layers, compositions and thicknesses of the underlayer and the non-magnetic spacer layer were changed.

Overwriting characteristics (OW) of the obtained disks were evaluated. As to the overwriting characteristics (OW), since their absolute values generally tend to increase to be saturated as writing currents increase, OW values are indicated herein with saturated values. These results are shown in Table 11 together with compositions and thicknesses of magnetic layers, underlayers and non-magnetic spacer layers.

TABLE 11

| Example | Composition of magnetic layers 3 and 5 (at %) | Thickness of magnetic layers 3 and 5 (Å) | Composition of underlayer 2c (at %) | Thickness of underlayer 2c (Å) | Composition of spacer layer 4 (at %) | Thickness of spacer layer 4 (Å) | Overwriting characteristics (OW) (dB) |
|---|---|---|---|---|---|---|---|
| 23 | $Co_{78}Pt_{11}Cr_{11}$ | 120 | $Cr_{95}Mo_5$ | 50 | $Cr_{95}Mo_5$ | 50 | −42.5 |
| 83 | " | 230 | " | " | " | " | −38.5 |
| 84 | " | 120 | " | 150 | " | " | −39.2 |
| 85 | " | " | " | 50 | " | 100 | −38.0 |
| 86 | " | " | $Cr_{90}Mo_{10}$ | " | $Cr_{90}Mo_{10}$ | 50 | −41.5 |
| 87 | " | 230 | " | " | " | " | −38.6 |
| 88 | " | 120 | " | 150 | " | " | −39.0 |
| 89 | " | " | " | 50 | " | 100 | −38.1 |
| Comparative Example | | | | | | | |
| 4 | $Co_{78}Pt_{11}Cr_{11}$ | 120 | Cr | 50 | Cr | 50 | −36.3 |
| 10 | " | 270 | $Cr_{95}Mo_5$ | " | $Cr_{95}Mo_5$ | " | −36.5 |
| 11 | " | 120 | " | 200 | " | " | −36.9 |
| 12 | " | " | " | 50 | " | 150 | −32.5 |
| 13 | " | 270 | $Cr_{90}Mo_{10}$ | " | $Cr_{90}Mo_{10}$ | 50 | −36.2 |
| 14 | " | 120 | " | 200 | " | " | −36.5 |
| 15 | " | " | " | 50 | " | 150 | −32.3 |

As seen from the results shown in Table 11, overwriting characteristics of those utilizing CrMo alloys as the underlayers and the non-magnetic layers described in Examples 23, 29 and 83 to 88 are markedly more excellent than those of the medium utilizing Cr mentioned as Comparative Example 1. It can also be understood that overwriting characteristics may significantly vary depending on thicknesses of the magnetic layers, underlayers and non-magnetic spacer layers. To obtain overwriting characteristics equal to or more than −38 (dB), it is preferred that the film thicknesses are about 230 Å or less for the magnetic layers, about 150 Å or less for the underlayers and about 100 Å or less for the non-magnetic spacer layers. More preferably, the film thicknesses are about 150 Å or less for the magnetic layers, about 100 Å or less for the underlayers and about 80 Å or less for the non-magnetic spacer layers.

Example 89

The magnetic recording media of Example 1 were mounted on the magnetic recorder shown in FIG. 3 and recording and reproducing tests were performed. As a result, an S/N ratio of 25 dB could be obtained when surface recording density exceeded 600 Mbits/cm$^2$. When environmental condition resistance tests were carried out in the same manner as in Test Example 1, no problems were observed with respect to increase of errors, stiction and wear resistance and increase of friction coefficient.

In the above mentioned examples, the resulting disks have Cr first protective layer 6a and second protective layer 6b composed of $SiO_2$. Layer 6b makes the surface of the disk uneven so that the adsorption of a head to the surface of the disk is prevented.

In order to provide a disk with an uneven surface, the following texture technique is also applied to in the present invention.

Instead of Al underlayer film 2a, an aluminum (Al) or aluminum nitride (AlN) underlayer 2d with an uneven surface (cluster structure) is prepared by spattering on a glass substrate 1. Then on the above uneven underlayer 2d, CrMo underlayer 2c, first magnetic layer 3, non-magnetic spacer layer 4 and second magnetic layer 5 which are the same as those described in the above examples are laminated. On the second magnetic layer 5, a protective layer composed of carbon is laminated by spattering in place of the above Cr first protective layer 6a and second protective layer 6b. Then lubricating layer 7 is prepared on the carbon protective layer.

The unevenness of the above underlayer 2d is reflected to each layer on it, and a disk with an uneven surface of lubricating layer 7 can be obtained and this uneven surface prevents a disk from adsorbing to a head.

What is claimed is:

1. A magnetic recording medium comprising, on a substrate, at least two magnetic layers and at least one non-magnetic spacer layer between the magnetic layers, wherein the non-magnetic spacer layer(s) is/are comprised of an alloy comprising Cr and Mo, the magnetic layers are comprised of an alloy comprising Co and Pt, and Mo in the alloy of a non-magnetic spacer layer is present in an amount of about 2 to 30 at %.

2. A magnetic recording medium of claim 1, wherein Mo in the alloy of a non-magnetic spacer layer is present in an amount of about 5 to 15 at %.

3. A magnetic recording medium of claim 1, wherein face spacing of an alloy of a non-magnetic spacer layer is similar to or substantially equal to c axis length of hexagonal close-packed structure of an alloy of a magnetic layer.

4. A magnetic recording medium of claim 1, wherein the alloy of a non-magnetic spacer layer further comprises Zr.

5. A magnetic recording medium of claim 1, wherein alloy of at least one of the magnetic layers is an CoPtCr alloy.

6. A magnetic recording medium of claim 1, further comprising two or more underlayers provided between the substrate and the magnetic layer closest to the substrate wherein the two layers closest to the magnetic layer closest to the substrate comprise an underlayer of substrate side comprising Cr and an underlayer of magnetic layer side comprising Cr and Mo.

7. A magnetic recording medium of claim 1, wherein a first protective layer comprising Cr or a Cr alloy is provided on the magnetic layer farthest from the substrate and a second protective layer comprising silicon oxide is provided on the first protective layer.

8. A magnetic recording medium of claim 1, wherein the substrate is a glass substrate.

9. A magnetic recording medium of claim 1, further comprising an uneven underlayer provided between the substrate and the magnetic layer closest to the substrate and a protective layer comprising carbon provided on the magnetic layer farthest from the substrate.

10. A magnetic recording medium of claim 1 for reproducing by a magnetoresistive head.

11. A magnetic recorder comprising one or more magnetic disks and magnetoresistive heads, wherein the magnetic disks are the magnetic recording medium of claim 1.

12. A magnetic recording medium of claim 1, which exhibits a magnetic coercive force equal to or greater than 1900.

13. A magnetic recording medium comprising a group of magnetic layers comprising Co and Pt (CoPt magnetic layers) provided on a substrate and a non-magnetic underlayer between the substrate and the group of CoPt magnetic layers, wherein:

the group of CoPt magnetic layers comprises at least two magnetic layers, and at least one non-magnetic spacer layer(s) comprising Cr and Mo are provided between said magnetic layers, and difference ($d_{(002)}-d_{(110)}$) obtained by subtracting crystalline lattice spacing of bcc (110) faces in the non-magnetic spacer layers comprising Cr and Mo from crystalline lattice spacing of hcp (002) faces in the magnetic layers immediately adjacent the surface of the non-magnetic spacer layers facing away from the substrate falls within a range of from about 0.002 to 0.032 Å.

14. A magnetic recording medium of claim 13, wherein at least two non-magnetic spacer layers are provided and, for each of the non-magnetic spacer layers, the difference ($d_{(002)}-d_{(110)}$) obtained by subtracting crystalline lattice spacing of bcc (110) faces in the non-magnetic spacer layers comprising Cr and Mo from crystalline lattice spacing of hcp (002) faces in the magnetic layers immediately adjacent the surface of said non-magnetic spacer layers facing away from the substrate independently falls within a range of from about 0.002 to 0.032 Å.

15. A magnetic recording medium of claim 13, wherein the difference ($d_{(002)}-d_{(110)}$) obtained by subtracting crystalline lattice spacing of bcc (110) faces in the non-magnetic spacer layers comprising Cr and Mo from crystalline lattice spacing for hcp (002) faces in the magnetic layers immediately adjacent the surface of the non-magnetic spacer layers facing away from the substrate falls within a range of from about 0.014 to 0.030 Å.

16. A magnetic recording medium of claim 13, wherein at least two non-magnetic spacer layers are provided and, for each of the non-magnetic spacer layers, the difference ($d_{(002)}-d_{(110)}$) obtained by subtracting crystalline lattice spacing of bcc (110) faces in the non-magnetic spacer layers comprising Cr and Mo from crystalline lattice spacing of hcp (002) faces in the magnetic layers immediately adjacent the surface of the non-magnetic spacer layers facing away from the substrate independently falls within a range of from about 0.014 to 0.030 Å.

17. A magnetic recording medium of claim 13, wherein the substrate is a glass substrate.

18. A magnetic recording medium of claim 13, wherein the non-magnetic underlayer is an uneven layer between the substrate and the magnetic layer closest to the substrate and a protective layer comprising carbon is provided on the magnetic layer farthest from the substrate.

19. A magnetic recording medium of claim 13 for reproducing by a magnetoresistive head.

20. A magnetic recorder comprising one or more magnetic disks and magnetoresistive heads, wherein the magnetic disks are the magnetic recording medium of claim 13.

21. A magnetic recording medium of claim 13, wherein the CoPt alloy magnetic layers are CoPtCr alloy layers.

22. A magnetic recording medium of claim 21, wherein the CoPtCr alloy layers have a Co content of about 60 to 90 at %, Pt content of about 4 to 20 at %, and Cr content of about 3 to 30 at %.

23. A magnetic recording medium comprising a group of magnetic layers comprising Co and Pt (CoPt magnetic layers) provided on a substrate and a non-magnetic underlayer between the substrate and the group of CoPt magnetic layers, wherein:

the group of CoPt magnetic layers comprises at least two magnetic layers, and at least one non-magnetic spacer layer(s) comprising Cr and Mo are provided between said magnetic layers, difference ($d_{(002)}-d_{(110)}$) obtained by subtracting crystalline lattice spacing of bcc (110) faces in the non-magnetic spacer layers comprising Cr and Mo from crystalline lattice spacing of hcp (002) faces in the magnetic layers immediately adjacent the surface of the non-magnetic spacer layers facing away from the substrate falls within a range of from about 0.002 to 0.032 Å, the non-magnetic underlayer comprising at least one layer(s), and the layer of the underlayer immediately adjacent the magnetic layer closest to the substrate comprises Cr and Mo, and difference ($d_{(002)}-d_{(110)}$) obtained by subtracting crystalline lattice spacing of bcc (110) faces in the non-magnetic underlayer comprising Cr and Mo from crystalline lattice spacing of hcp (002) faces in the magnetic layer closest to the substrate falls within a range of from about 0.002 to 0.032 Å.

24. A magnetic recording medium of claim 23, wherein at least two non-magnetic spacer layers are provided and, for each of the non-magnetic spacer layers, difference ($d_{(002)}-d_{(110)}$) obtained by subtracting crystalline lattice spacing of bcc (110) faces in the non-magnetic spacer layers comprising Cr and Mo from crystalline lattice spacing of hcp (002) faces in the magnetic layers immediately adjacent the surface of the non-magnetic spacer layers facing away from the substrate independently falls within a range of from about 0.002 to 0.032 Å.

25. A magnetic recording medium of claim 23, wherein the difference ($d_{(002)}-d_{(110)}$) obtained by subtracting crystalline lattice spacing of bcc (110) faces in the non-magnetic spacer layers comprising Cr and Mo from crystalline lattice spacing of hcp (002) faces in the magnetic layers immediately adjacent the surface of the non-magnetic spacer layers facing away from the substrate falls within a range of from about 0.014 to 0.030 Å.

26. A magnetic recording medium of claim 23, wherein at least two non-magnetic spacer layers are provided and, for each of the non-magnetic spacer layers, difference ($d_{(002)}-d_{(110)}$) obtained by subtracting crystalline lattice spacing of bcc (110) faces in the non-magnetic spacer layers comprising cr and Mo from crystalline lattice spacing of hcp (002) faces in the magnetic layers immediately adjacent the surface of the non-magnetic spacer layers facing away from the substrate independently falls within a range of from about 0.014 to 0.030 Å.

27. A magnetic recording medium of claim 23, wherein the difference ($d_{(002)}-d_{(110)}$) obtained by subtracting crystalline lattice spacing of bcc (110) faces in the non-magnetic underlayers comprising Cr and Mo from crystalline lattice spacing of hcp (002) faces in the magnetic layers falls within a range of from about 0.014 to 0.030 Å.

28. A magnetic recording medium of claim 23, wherein the substrate is a glass substrate.

29. A magnetic recording medium of claim 23 for reproducing by a magnetoresistive head.

30. A magnetic recorder comprising one or more magnetic disks and magnetoresistive heads, wherein the magnetic disks are the magnetic recording medium of claim 23.

31. A magnetic recording medium of claim 23, wherein between the non-magnetic underlayer comprising Cr and Mo and the substrate, at least one additional non-magnetic underlayer(s) is/are provided, and one of the additional non-magnetic underlayers contacting with the non-magnetic underlayer comprising Cr and Mo is comprises a metal having a body-centered close-packed crystalline structure.

32. A magnetic recording medium of claim 31, wherein the non-magnetic underlayer comprising a metal having a body-centered close-packed crystalline structure is a Cr layer.

33. A magnetic recording medium of claim 23, wherein the CoPt alloy magnetic layers are CoPtCr alloy layers.

34. A magnetic recording medium of claim 33, wherein the CoPtCr alloy layers have a Co content of about 60 to 90 at %, Pt content of about 4 to 20 at %, and Cr content of about 3 to 30 at %.

35. A magnetic recording medium comprising, on a substrate, at least two magnetic layers and at least one non-magnetic spacer layer between the magnetic layers, wherein the non-magnetic spacer layer(s) is/are comprised of an alloy comprising Cr, Mo and Zr, and the magnetic layers are comprised of an alloy comprising Co and Pt.

36. A magnetic recording medium of claim 35, wherein face spacing of an alloy of a non-magnetic spacer layer is similar to or substantially equal to c axis length of hexagonal close-packed structure of an alloy of a magnetic layer.

37. A magnetic recording medium of claim 35, wherein the alloy of at least one of the magnetic layers is an CoPtCr alloy.

38. A magnetic recording medium of claim 35, further comprising two or more underlayers provided between the substrate and the magnetic layer closest to the substrate wherein the two layers closest to the magnetic layer closest to the substrate comprise an underlayer of substrate side comprising Cr and an underlayer of magnetic layer side comprising Cr and Mo.

39. A magnetic recording medium of claim 35, wherein a first protective layer comprising Cr or a Cr alloy is provided on the magnetic layer farthest from the substrate and a second protective layer comprising silicon oxide is provided on the first protective layer.

40. A magnetic recording medium of claim 35, wherein the substrate is a glass substrate.

41. A magnetic recording medium of claim 35, further comprising an uneven underlayer provided between the substrate and the magnetic layer closest to the substrate and a protective layer comprising carbon provided on the magnetic layer farthest from the substrate.

42. A magnetic recording medium of claim 35 for reproducing by a magnetoresistive head.

43. A magnetic recorder comprising one or more magnetic disks and magnetoresistive heads, wherein the magnetic disks are the magnetic recording medium of claim 35.

44. A magnetic recording medium of claim 35, which exhibits a magnetic coercive force equal to or greater than 1900.

45. A method for producing the magnetic recording medium of claim 13, wherein the group of CoPt magnetic layers and the non-magnetic spacer layer comprising Cr and Mo are formed by a spattering technique using a substrate heating temperature within a range of about 250 to 425° C. and an Ar gas pressure within a range of about 0.5 to 10 mTorr.

46. A method for producing the magnetic recording medium of claim 23, wherein at least the non-magnetic underlayer comprising Cr and Mo, the group of CoPt magnetic layers, and the non-magnetic spacer layers comprising Cr and Mo are formed by a spattering technique using a substrate heating temperature within a range of about 250 to 425° C. and an Ar gas pressure within a range of about 0.5 to 10 mTorr.

* * * * *